US008665679B2

(12) United States Patent
Yajima et al.

(10) Patent No.: US 8,665,679 B2
(45) Date of Patent: Mar. 4, 2014

(54) OPTICAL READ/WRITE APPARATUS AND READ APPARATUS

(75) Inventors: Masatoshi Yajima, Osaka (JP); Yohichi Saitoh, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/609,535

(22) Filed: Sep. 11, 2012

(65) Prior Publication Data
US 2013/0094337 A1    Apr. 18, 2013

(30) Foreign Application Priority Data
Oct. 12, 2011   (JP) ................................. 2011-224661

(51) Int. Cl.
*G11B 7/00*    (2006.01)
(52) U.S. Cl.
USPC .................. 369/44.37; 369/47.14; 369/53.15; 369/53.35; 369/95; 369/124.02; 369/124.03
(58) Field of Classification Search
None
See application file for complete search history.

(56) References Cited

U.S. PATENT DOCUMENTS

| 5,285,436 A | 2/1994 | Moribe | |
|---|---|---|---|
| 2005/0018572 A1* | 1/2005 | Gushima et al. | 369/53.15 |
| 2011/0128835 A1* | 6/2011 | Iriyama | 369/47.49 |

FOREIGN PATENT DOCUMENTS

| JP | 03-137876 A | 6/1991 |
|---|---|---|
| JP | 03-201222 A | 9/1991 |
| JP | 06-162532 A | 6/1994 |

* cited by examiner

*Primary Examiner* — Wayne Young
*Assistant Examiner* — Brian Butcher
(74) *Attorney, Agent, or Firm* — Renner, Otto, Boisselle & Sklar, LLP

(57) ABSTRACT

In one embodiment, the optical read/write apparatus includes a plurality of optical pickups arranged to cross tracks of an optical storage medium and a control section. On finding the data that has been written by any of those optical pickups inaccurate or on detecting any defect at a location where data is going to be written by any of the optical pickups, the control section instructs another one of the optical pickups to write that data on a different track from a track on which the data should have been written.

12 Claims, 20 Drawing Sheets

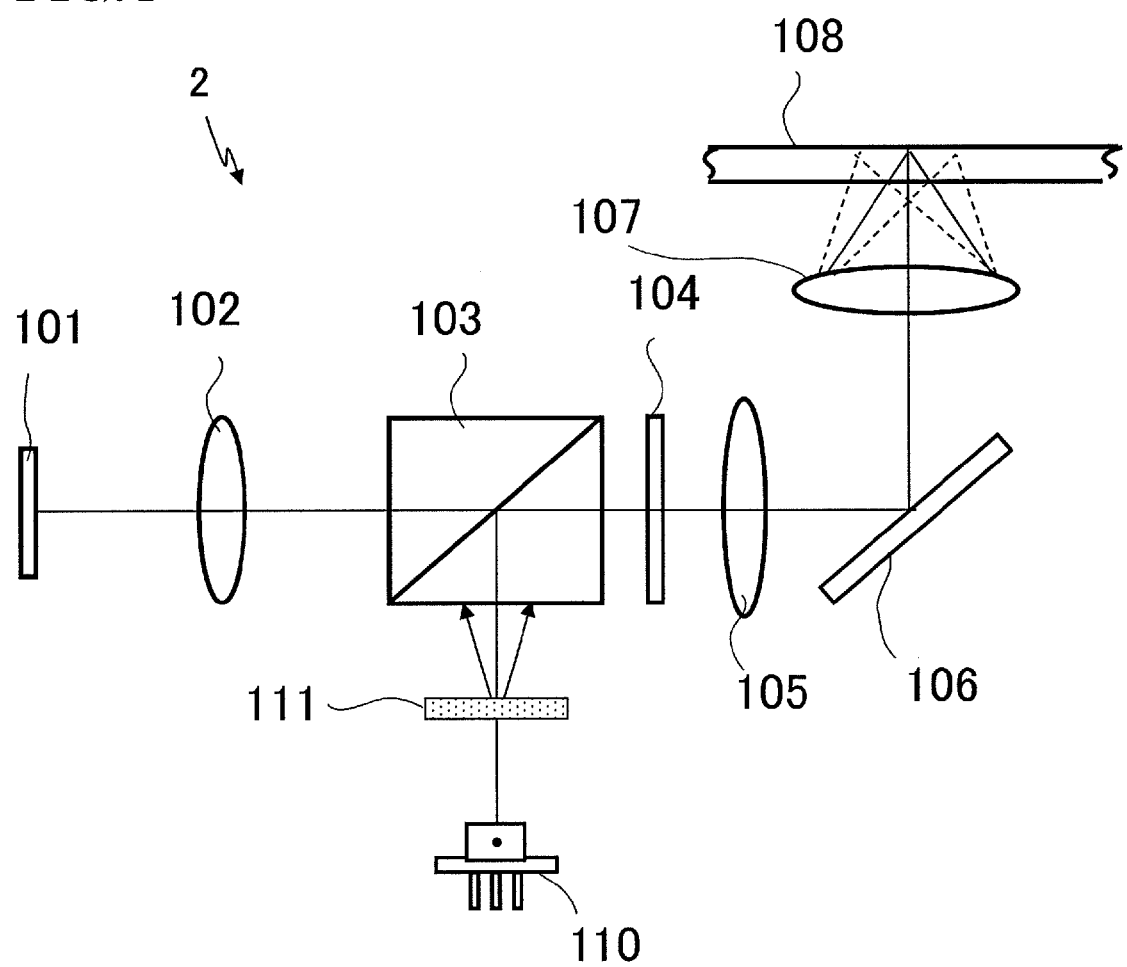

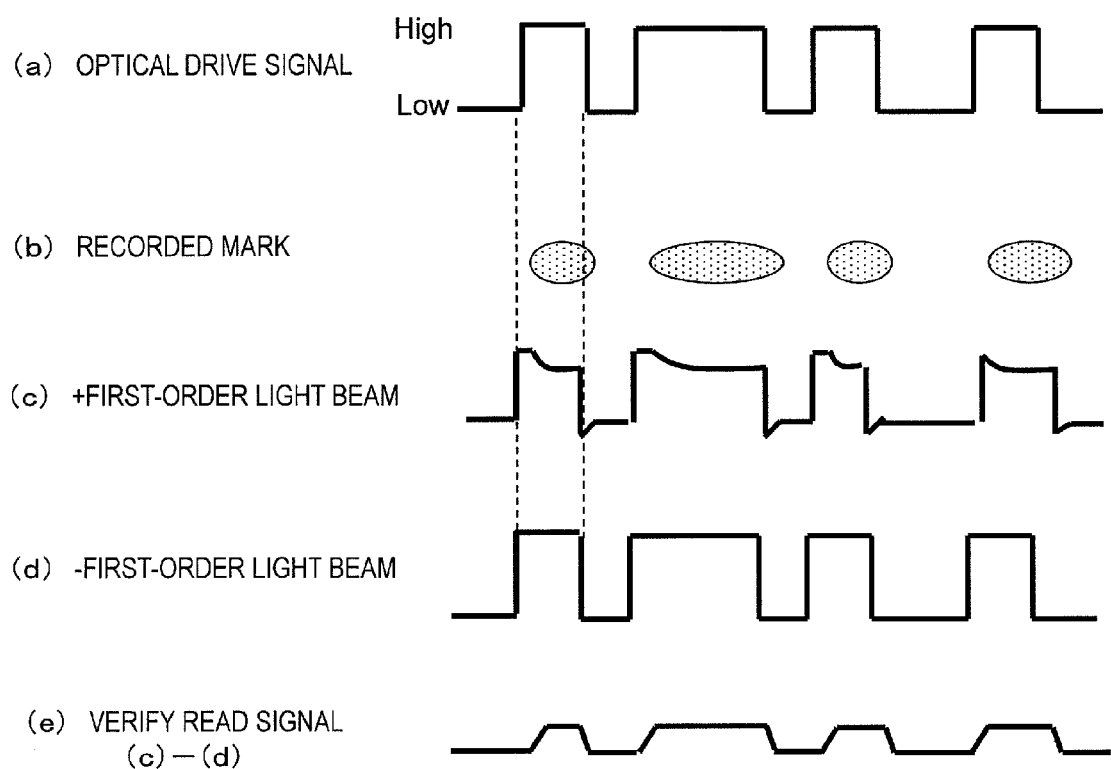

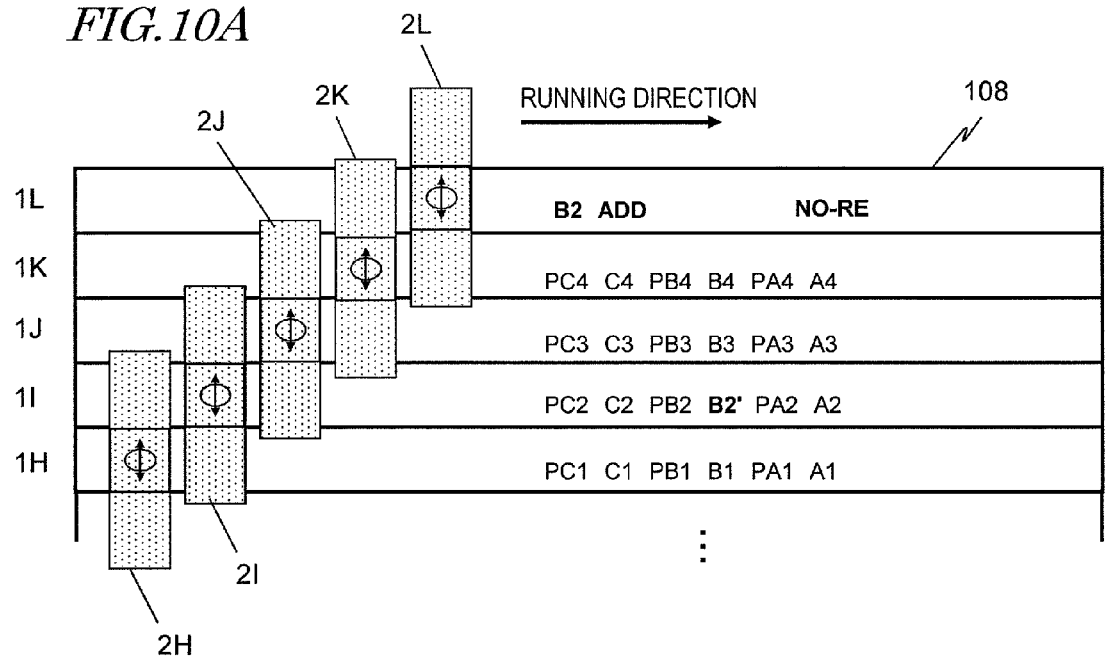

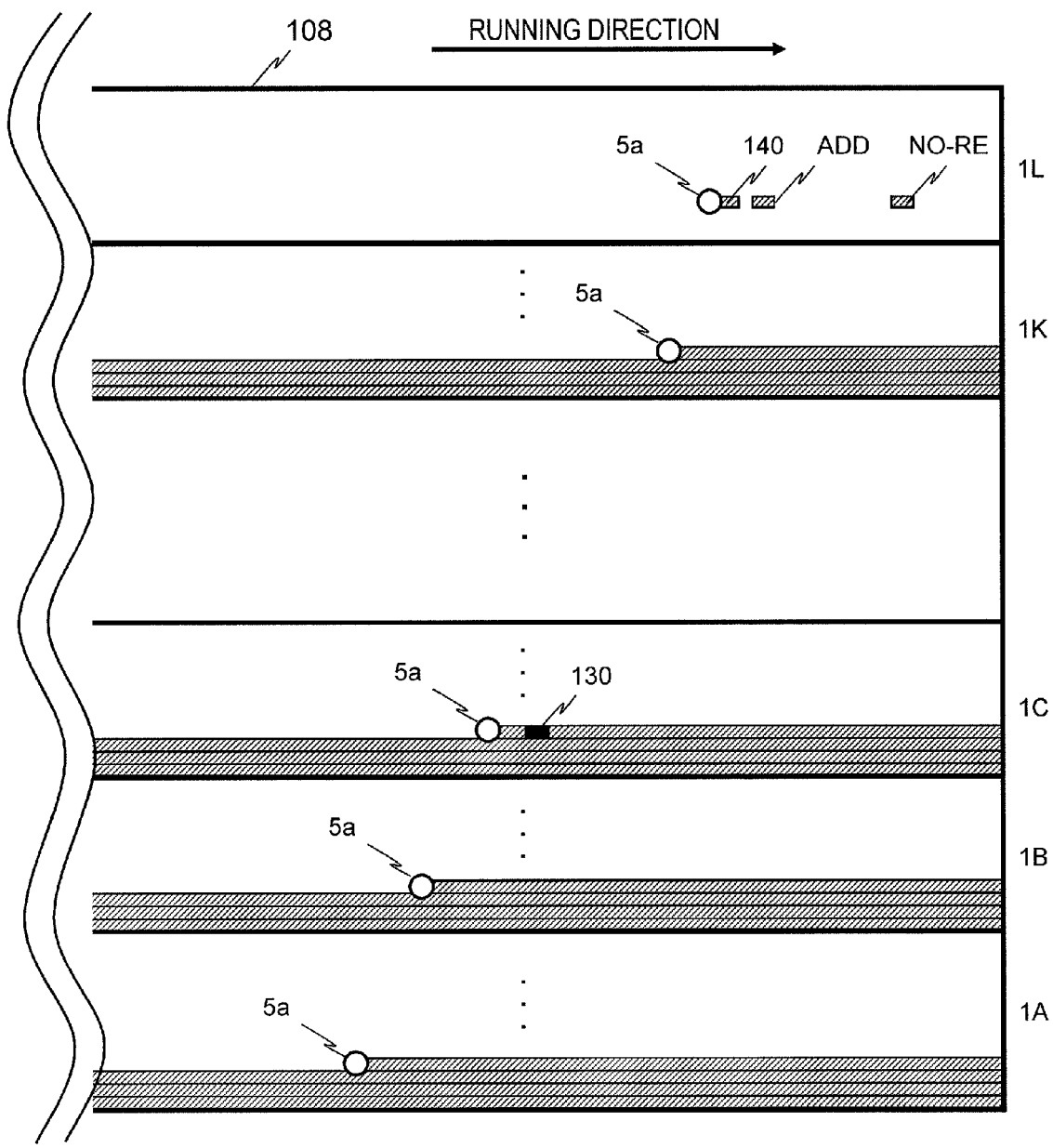

DATA IN BUFFER

| A1 PA1 A2 B1 PA2 B2' A3 PA3 PB2 A4 NO-RE PA4 ADD B2 ··· |

READ DATA

| A1 A2 A3 A4 B1 B2 B3 B4 C1 C2 C3 C4 ··· |

CONVENTIONAL ART
*FIG.21*
(a)
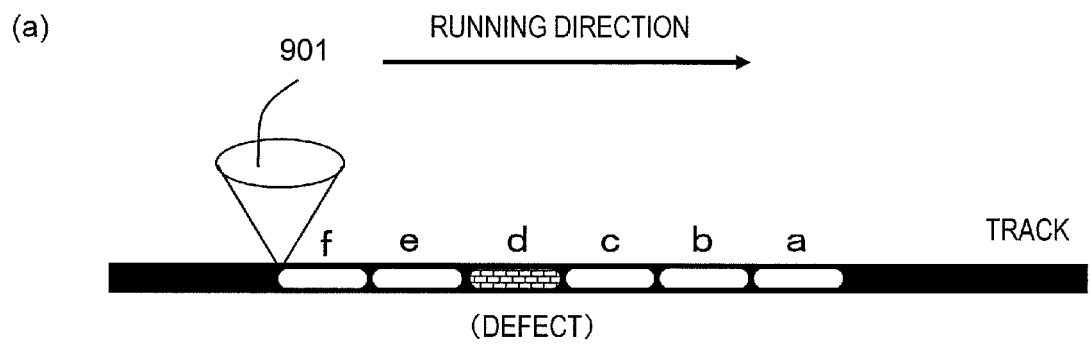
(b)
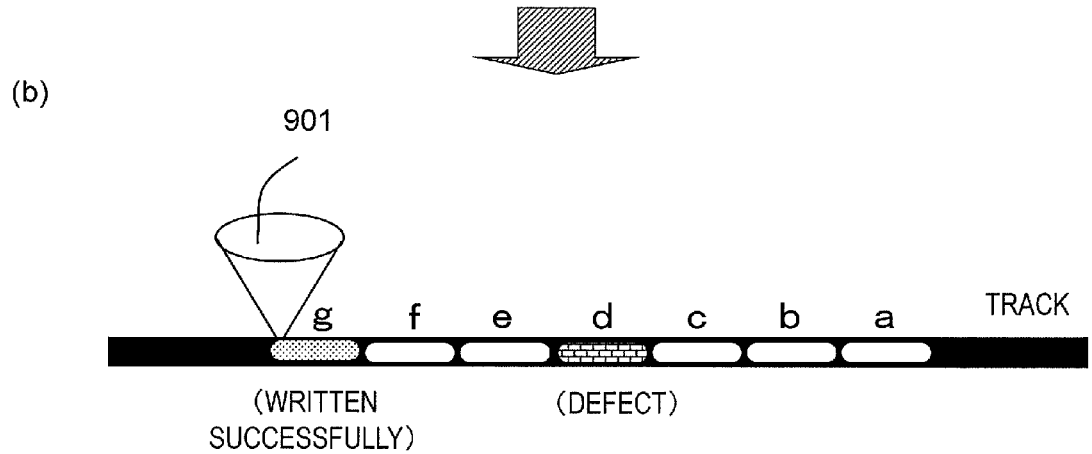

OPTICAL READ/WRITE APPARATUS AND READ APPARATUS

BACKGROUND OF THE INVENTION

1. Field of the Invention

The present disclosure relates to an optical read/write apparatus and read apparatus that reads and writes data from/on an optical storage medium such as an optical tape, an optical disc or an optical card using multiple optical pickups in parallel.

2. Description of the Related Art

Recently, the size of digital data to process has been rising steeply year by year as the resolutions of video data and still picture data have been tremendously increased and as increasing numbers of paper media have been converted into electronic ones. Meanwhile, so-called "crowd computing" technologies that allow people to use various kinds of applications and services via servers and storage systems on some network have become more and more popular nowadays. According to such crowd computing technologies, as a huge number of users save various kinds of data on that storage system on the network, the amount of data accumulated there should keep on skyrocketing from now on.

In the meantime, as regulations have been established one after another with regard to the duty of preserving such a huge amount of data saved, it should also be increasingly important to devise a method for saving that enormous amount of data as securely and as reliably as possible.

In order to write data of such a huge size optically on a storage medium, an apparatus that performs read/write operations in parallel by arranging multiple sets of light-emitting and light-receiving elements with respect to an optical storage medium has been proposed as disclosed in Japanese Laid-Open Patent Publication No. 3-201222 (which will be referred to herein as "Patent Document No. 1" for convenience sake).

FIG. 20 is a schematic representation illustrating a part of a simplified version of the apparatus disclosed in Patent Document No. 1. As shown in FIG. 20, multiple sets of light-emitting elements 802 and light-receiving elements 803 are arranged to face the same side of an optical recording tape 801. In this example, six sets of light-emitting elements 802 and light-receiving elements 803 are arranged and read/write operations can be performed in parallel by using them simultaneously.

Although Patent Document No. 1 does not mention the operation of seeing if data has been written as intended on an optical storage medium (which will be referred to herein as a "verify operation"), an apparatus that is designed to write such an enormous amount of data on an optical storage medium should do that verify operation to increase the reliability of storage. Thus, to meet such demand, a so-called "DRAW (direct read after write)" technology for performing a write operation and a read operation for verification purposes simultaneously has been proposed. A known read/write apparatus that adopts the DRAW technology is disclosed in Japanese Laid-Open Patent Publication No. 6-162532 (which will be referred to herein as "Patent Document No. 2" for convenience sake).

Patent Document No. 1 does not disclose the verify operation of seeing if data has been written as intended by getting the data that has been written by the light-emitting elements 802 on the optical recording tape 801 read by the light-receiving elements 803.

On the other hand, Patent Document No. 2 does disclose a read/write apparatus that performs a verify operation but fails to disclose a configuration for detecting any data that has not been written successfully on an optical storage medium and writing that data all over again elsewhere in a short time.

Thus, an embodiment of the present invention provides an optical read/write apparatus that sees if there is any data that has been written unsuccessfully on the storage area of a given optical storage medium or if there is anything wrong with the storage medium and that can quickly write the data in question elsewhere if the answer is YES.

SUMMARY OF THE INVENTION

An optical read/write apparatus as an embodiment of the present invention includes: a plurality of optical pickups which are arranged to cross tracks of an optical storage medium and each of which is configured to be able to write data on the optical storage medium and verify the data that has just been written there in parallel; and a control section configured to instruct the plurality of optical pickups to write data and verify if the data has been written accurately by those optical pickups. On finding the data that has been written by any of those optical pickups inaccurate or on detecting any defect at a location where data is going to be written by any of the optical pickups, the control section instructs another one of the optical pickups to write that data on a different track from a track on which the data should have been written.

In one embodiment, the ranges of tracks on which data is able to be written are different from each other between the optical pickups.

In another embodiment, in making that another optical pickup write the data, the control section instructs the optical pickup to write not only that data but also a piece of information indicating a location on the optical storage medium on which that data should have been written.

In still another embodiment, that another optical pickup is one of two terminal ones of the optical pickups.

In yet another embodiment, that another optical pickup is one of the optical pickups that is located at the tail with respect to tracks of the optical storage medium that are running.

In yet another embodiment, each of the plurality of optical pickups includes: a light source; a light-splitting element configured to split the light beam that has been emitted from the light source into a write beam, a first read beam and a second read beam; an optical system configured to converge the write beam and the first and second read beams onto the same track on the optical storage medium so that the same location on the optical storage medium is scanned with the write beam before being scanned with the first read beam and is also scanned with the second read beam before being scanned with the write beam; and a photodetector configured to receive the write beam and first and second read beams that have been reflected from the optical storage medium and output electrical signals.

In one embodiment, each of the plurality of optical pickups includes: a light source configured to emit a write beam and a read beam; an optical system configured to converge the write beam and the read beam onto the same track on the optical storage medium so that the same location on the optical storage medium is scanned with the write beam before being scanned with the read beam; and a photodetector configured to receive the write and read beams that have been reflected from the optical storage medium and configured to output electrical signals.

In another embodiment, if meander detecting data is stored on some of the tracks of the optical storage medium, the control section instructs one of the optical pickups, that is able to read data from the track on which the meander detecting data is stored, to read that meander detecting data, and detects the meandering state of the optical storage medium based on the meander detecting data.

In still another embodiment, the control section divides data to be written into multiple pieces and makes at least two of the optical pickups, excluding that another optical pickup, write those multiple pieces in parallel with each other.

In this particular embodiment, the control section instructs the at least two optical pickups to further write error correction codes that are associated with the multiple pieces.

In yet another embodiment, if data of a predetermined length has been written successfully by the plurality of optical pickups, the control section makes that another optical pickup write a piece of information indicating that the data of the predetermined length has been written successfully.

An optical read/write apparatus as another embodiment of the present invention includes: a plurality of optical pickups which are arranged to cross tracks of an optical storage medium and each of which is configured to be able to write data on the optical storage medium and verify the data that has just been written there in parallel; and a control section configured to instruct the plurality of optical pickups to write data and verify if the data has been written accurately by those optical pickups. The control section is configured to divide the data to be written into multiple pieces and instructs at least two of the optical pickups to write the multiple pieces in parallel with each other.

In one embodiment, on finding the data that has been written by any of those optical pickups inaccurate or on detecting any defect at a location where data is going to be written by any of the optical pickups, the control section instructs another one of the optical pickups to write that data on a different track from a track on which the data should have been written.

A read apparatus as an embodiment of the present invention reads data that has been written on the optical storage medium by an optical read/write apparatus according to any of the embodiments described above. The read apparatus includes: a plurality of optical pickups which are arranged to cross tracks of the optical storage medium and each of which is configured to be able to read the data that has been written on the optical storage medium; a buffer configured to sequentially store the data that has been read by those optical pickups; and a signal processing section configured to retrieve and rearrange the data that is stored in the buffer, thereby reading the data that is stored on the optical storage medium.

According to an embodiment of the present invention, even if data has failed to be written as intended on an optical storage medium or if there is anything wrong with the storage medium, data can be written quickly on a replacement area.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIG. 4 illustrates the arrangement of an optical pickup in the optical read/write apparatus of the first embodiment.

Portion (a) of FIG. 6 shows the waveform of an optical drive signal, portion (b) of FIG. 6 illustrates recorded marks, portions (c) and (d) of FIG. 6 show the waveforms of signals representing the reflected light beams of ± first-order light beams, respectively, and portion (e) of FIG. 6 shows the waveform of a verify read signal.

Figure 7:
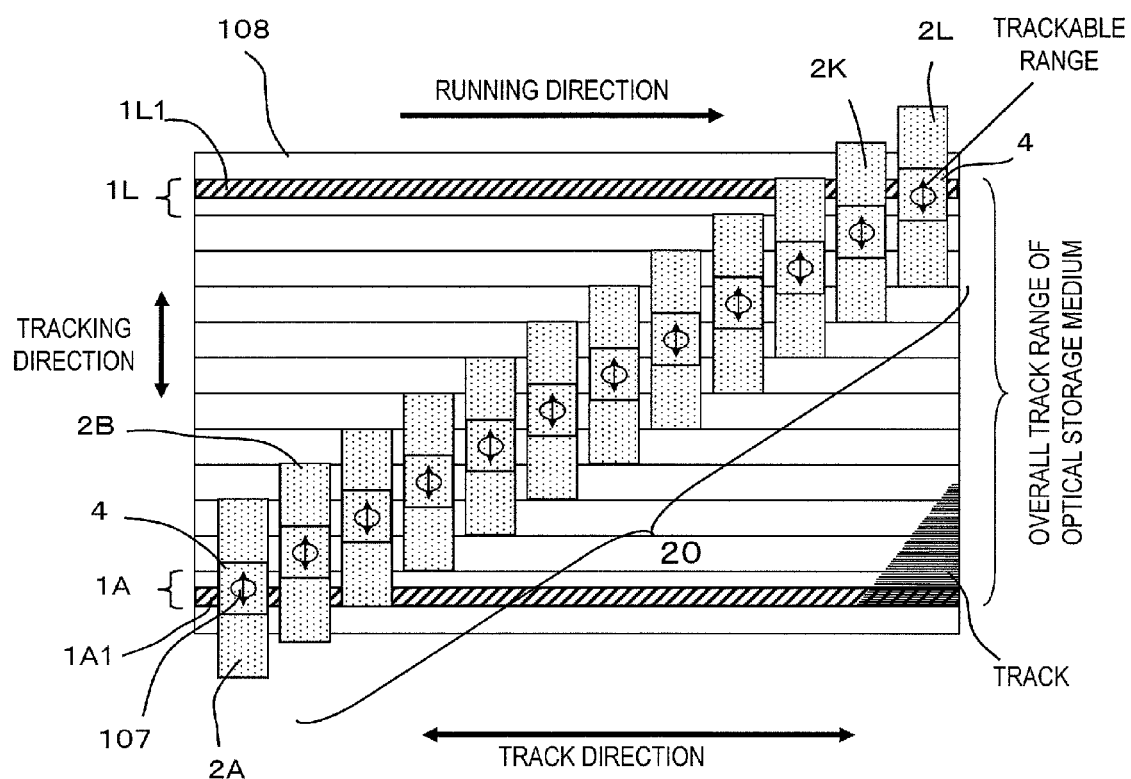

FIG. 7 illustrates a configuration for an optical read/write apparatus as a first embodiment of the present invention.

Figure 8:
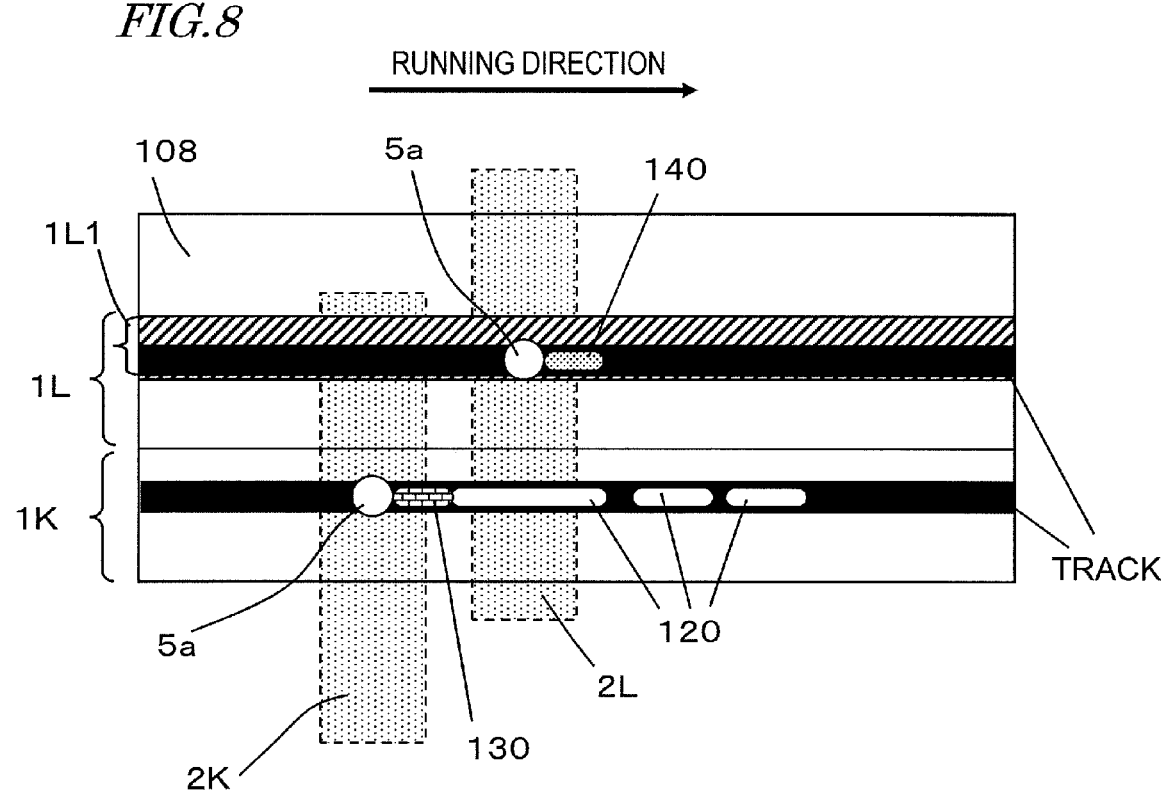

FIG. 8 illustrates how data has been written on the optical storage medium of the first embodiment.

Figure 9:
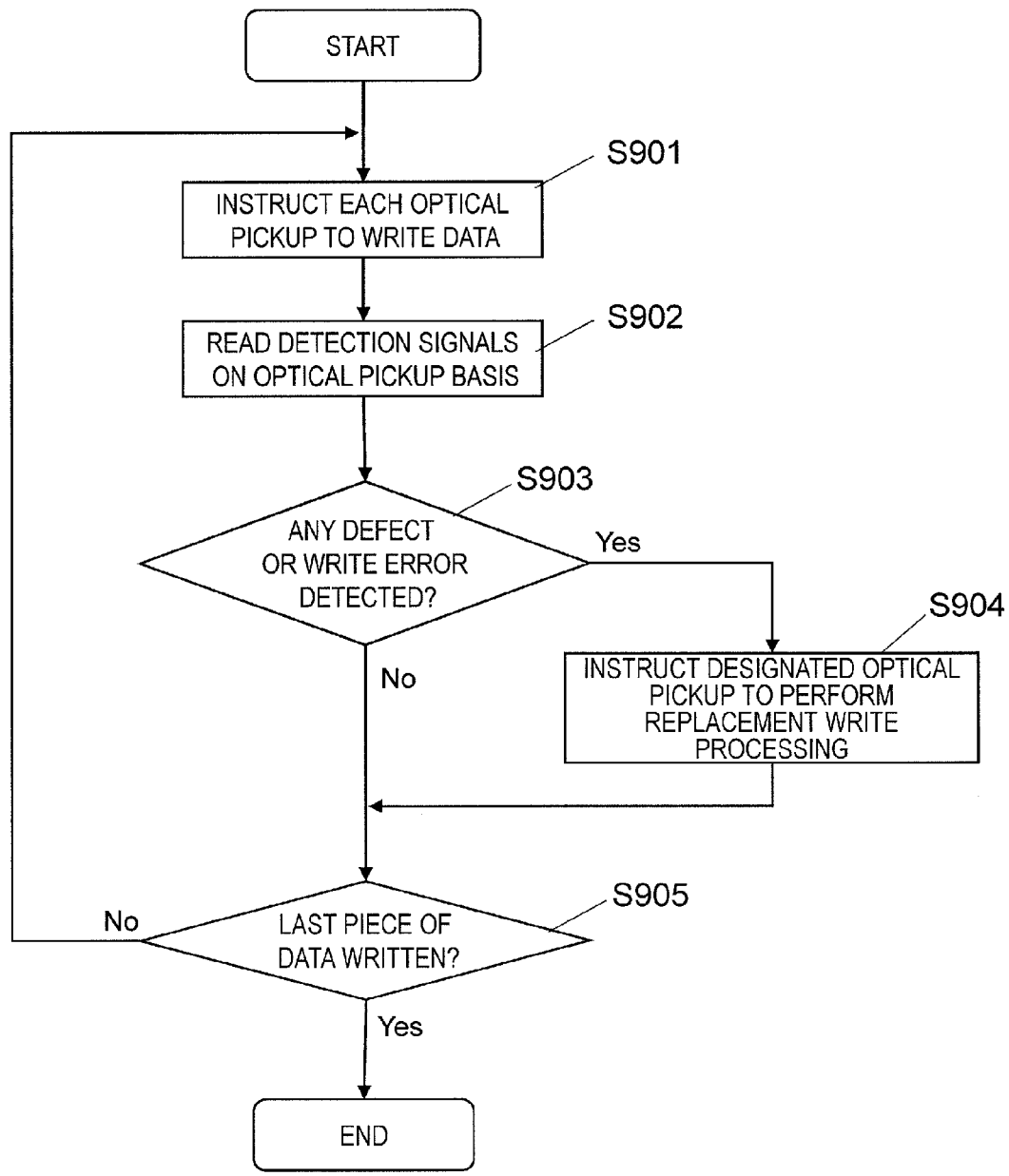

FIG. 9 is a flowchart showing an exemplary procedure of a write operation.

FIG. 10A is a schematic representation illustrating an exemplary set of data to be written on an optical storage medium.

FIG. 10B is a schematic representation illustrating another exemplary set of data to be written on an optical storage medium.

Figure 11:
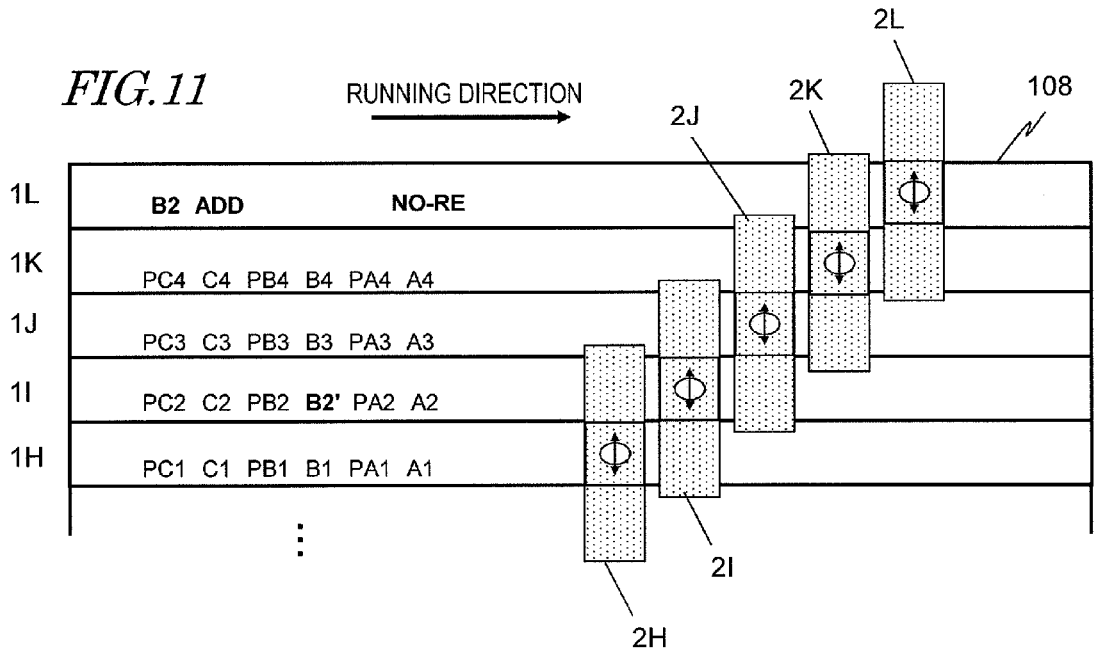

FIG. 11 is a schematic representation illustrating how to read data that has been written on an optical storage medium.

Figure 12:
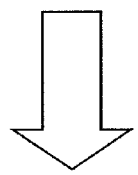

FIG. 12 illustrates conceptually how to perform read processing.

Figure 13:
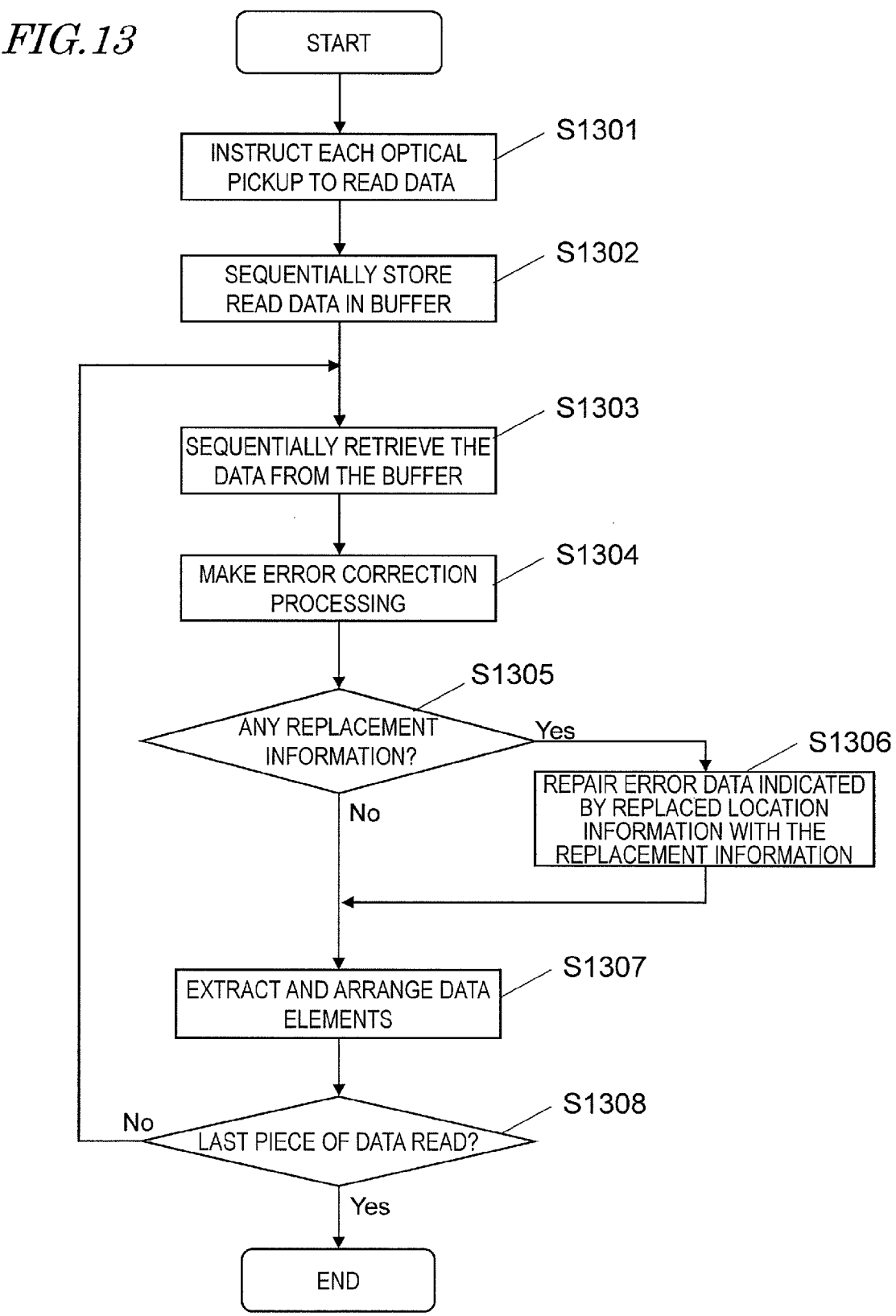

FIG. 13 is a flowchart showing an exemplary procedure of a read operation.

Figure 14:
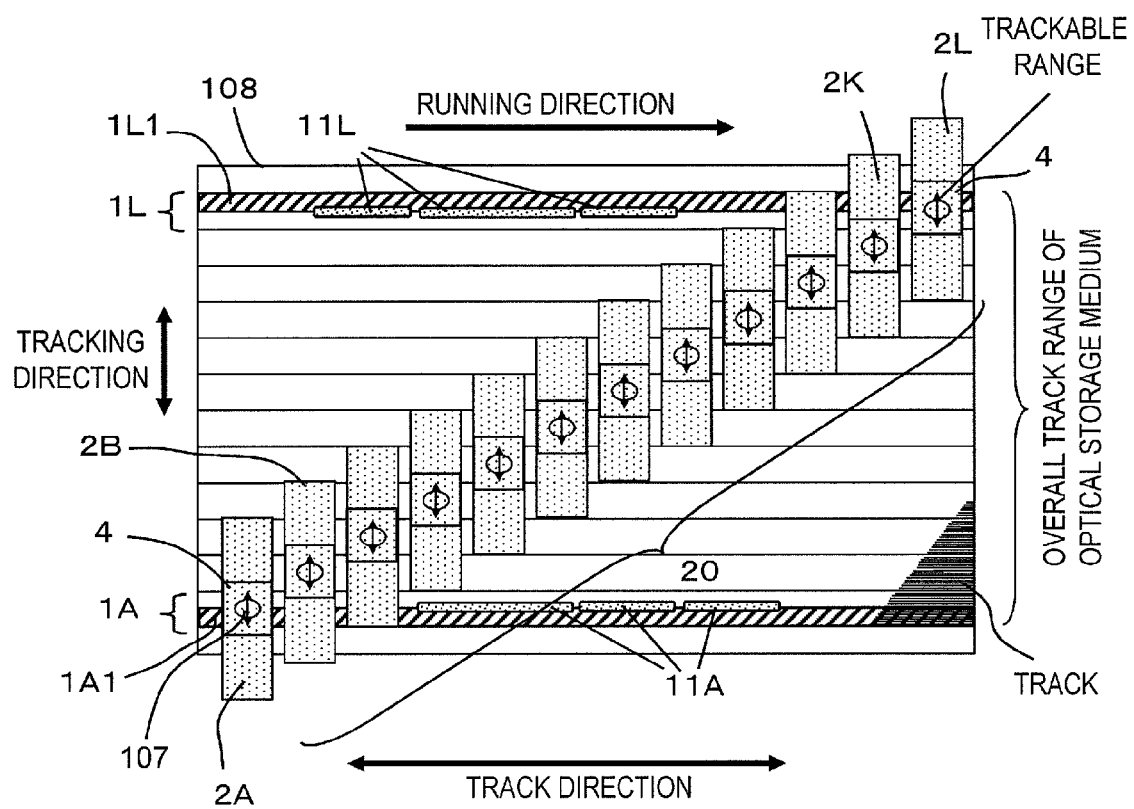

FIG. 14 illustrates a configuration for an optical read/write apparatus as a second embodiment of the present invention.

Figure 15:
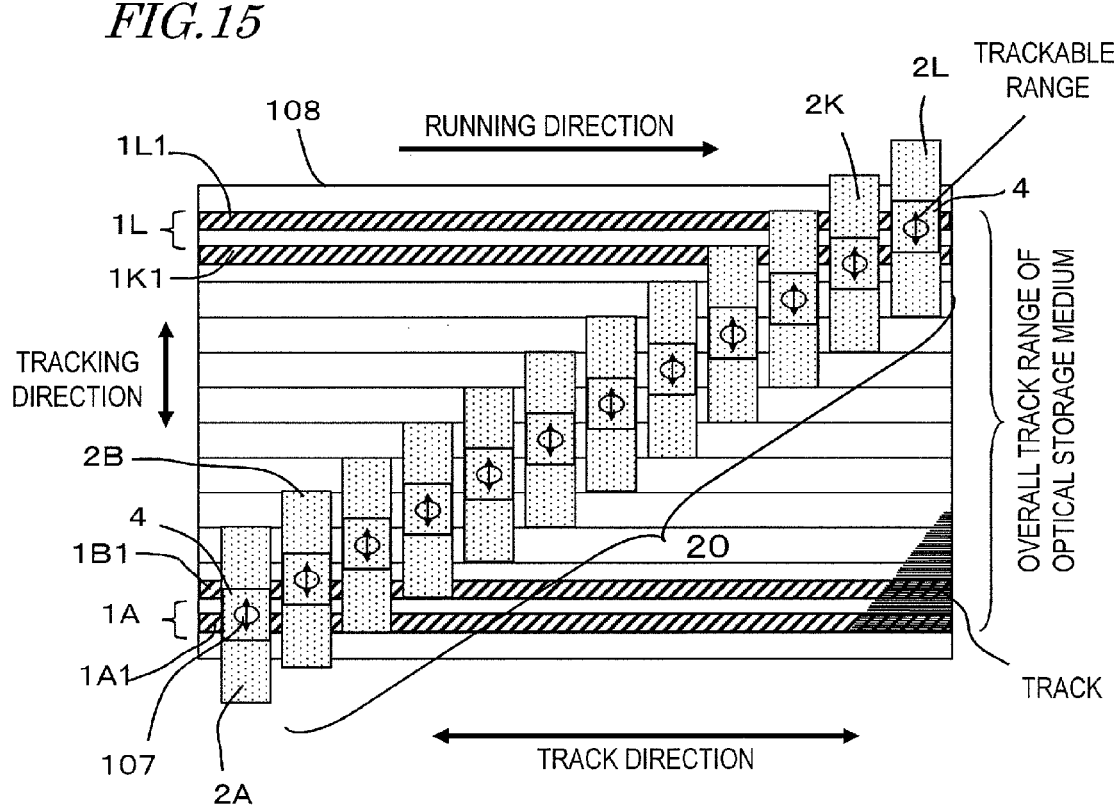

FIG. 15 illustrates an alternative configuration for the optical read/write apparatus of the first or second embodiment.

Figure 16:
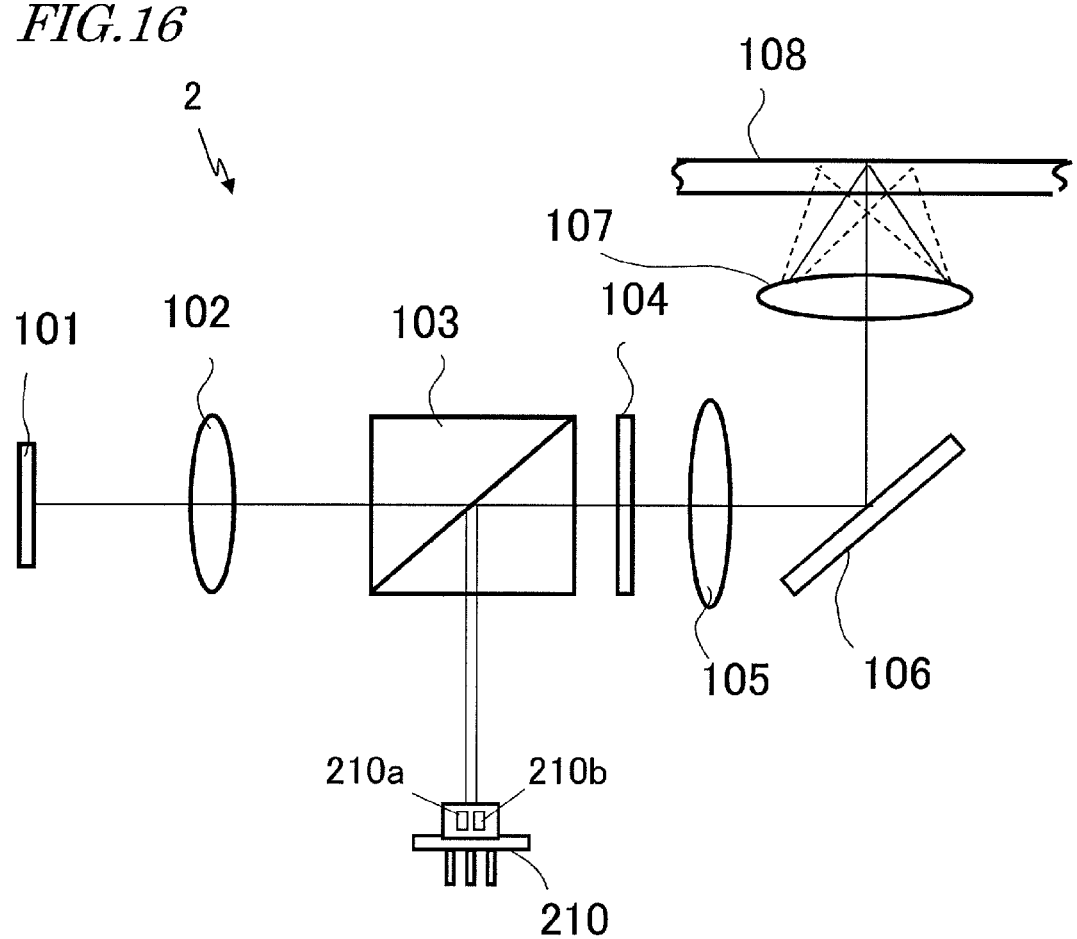

FIG. 16 illustrates an alternative configuration for the optical pickup of the first or second embodiment.

Figure 17:
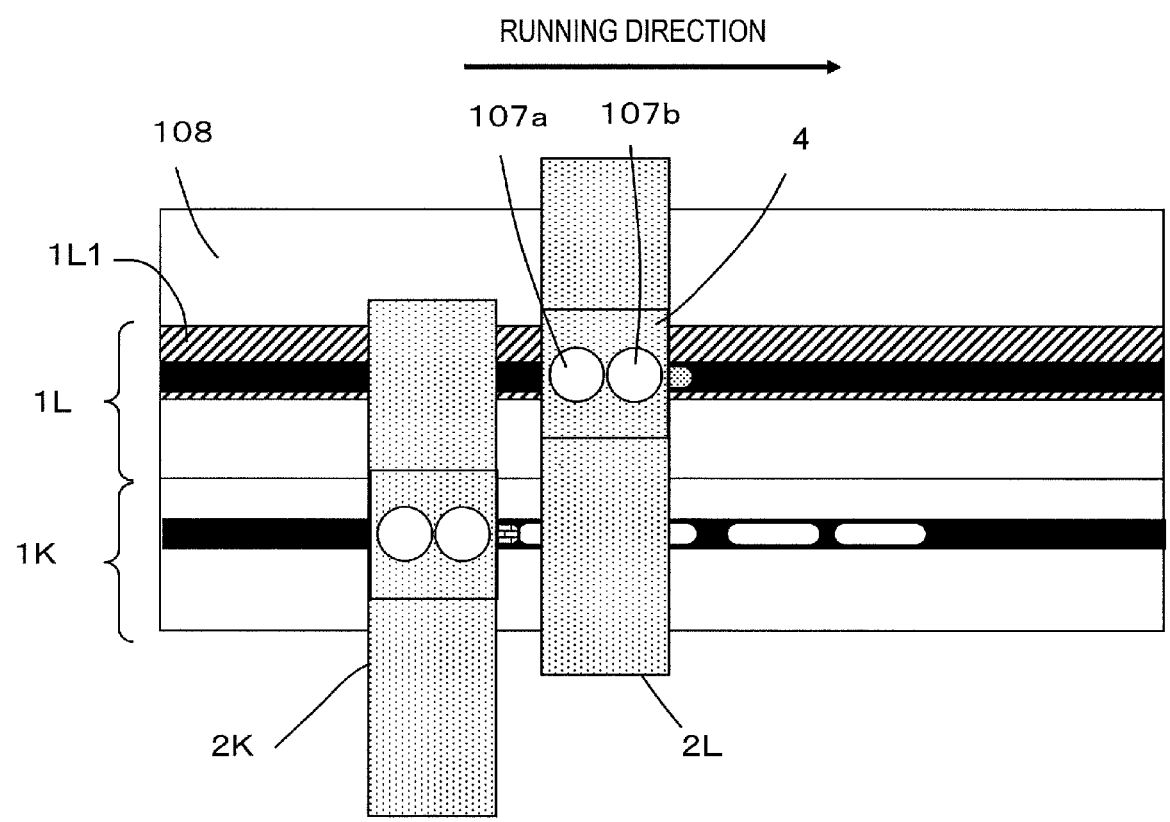

FIG. 17 illustrates an alternative configuration for the optical pickup of the first or second embodiment.

Figure 18:
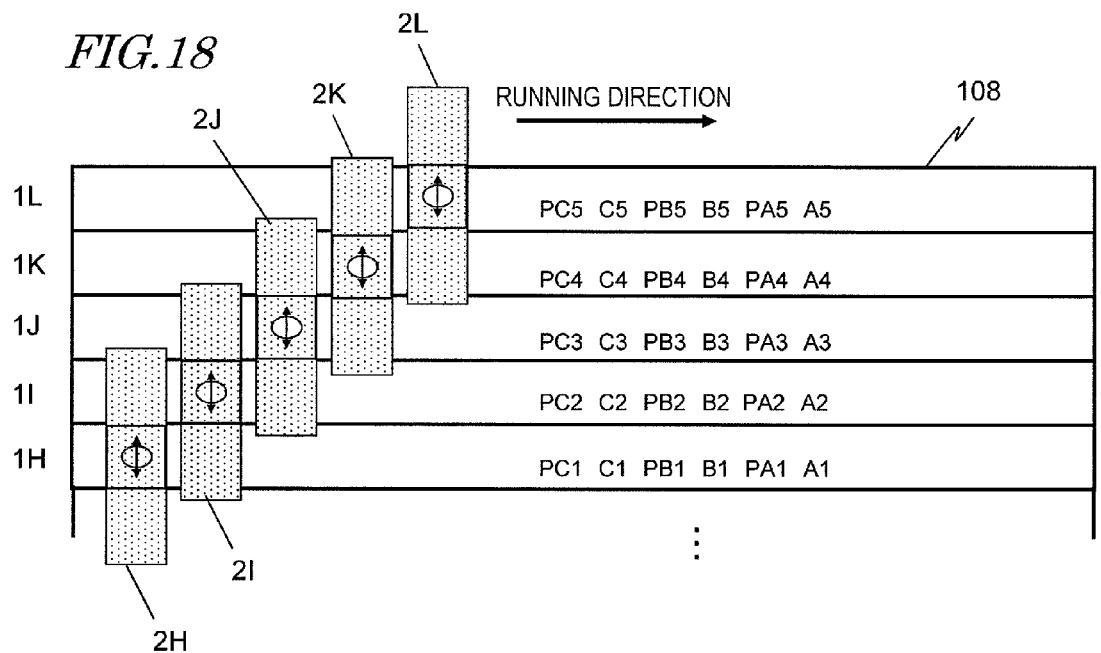

FIG. 18 is a schematic representation illustrating an exemplary set of data to be written on an optical storage medium according to a third embodiment of the present invention.

Figure 19:
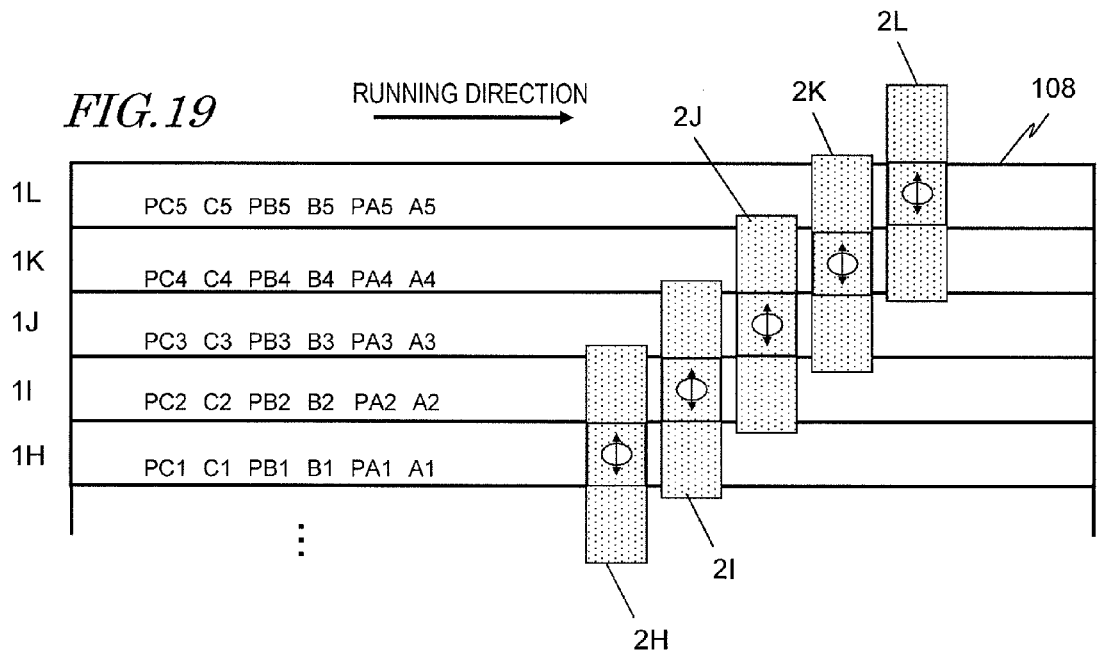

FIG. 19 is a schematic representation illustrating how to read data that has been written on an optical storage medium according to the third embodiment.

Figure 20:
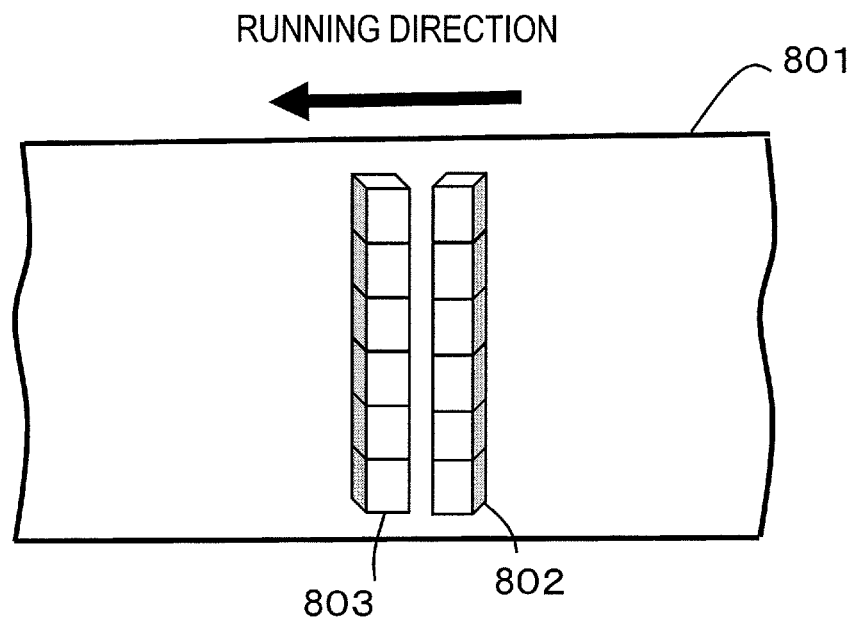

FIG. 20 illustrates the arrangement of optical pickups in a known optical read/write apparatus.

Portion (a) of FIG. 21 illustrates a storage state of a known optical storage medium when a defect has just been spotted and portion (b) of FIG. 21 illustrates how the storage state of the known optical storage medium changes after a rewrite operation has been performed.

DETAILED DESCRIPTION OF EMBODIMENTS

Hereinafter, embodiments of an optical read/write apparatus according to the present invention will be described in detail with reference to the accompanying drawings.

(Embodiment 1)

First of all, an optical read/write apparatus as a first embodiment of the present invention will be described. This embodiment provides an optical read/write apparatus that can be used effectively to perform a read/write operation as intended an optical storage medium with a low degree of random accessibility such as an optical tape. Before its specific configuration and operation are described, it will be described first what problem is grappled with by this embodiment.

If an apparatus that writes data on an optical storage medium with a low degree of random accessibility such as an optical tape has sensed, as a result of a verify operation, that the data has not been written successfully, one of the following two measures can be taken. One of the two is to rewind the optical storage medium and try the write operation on the same location once again. The other method is to write that data that has not been written successfully on a different location using the same optical pickup again. These measures can be taken not just in such a situation where it has been sensed as a result of a verify operation that the data has not been written successfully but also in a situation where any defect has been spotted in some area on a track of the optical storage medium.

According to the former method, however, the write operation is retried by rewinding the optical storage medium, and it will take a lot of time to get the write operation done, which is a problem. Particularly if write errors occurred at a lot of locations or if there were many defects, it could take a huge amount of time to get the write operation done as intended. Furthermore, if the given optical storage medium has any defective part, the write operation could not get done there after all, no matter how many times the write operation was retried there.

Meanwhile, although the time it takes to get the write operation done again can be certainly shortened according to the second method, it will still take an extra time to get the write operation retried. On top of that, since the continuity of the data will be lost in that case, it will also take a lot of time to get the read operation done, too. Hereinafter, the second measure will be described with reference to FIG. 21. Portion (a) of FIG. 21 illustrates a situation where using a light beam spot to be formed on a track on the optical storage medium through the objective lens 901 of the optical pickup, data is written on information areas a, b and c, the next information area d turns out to be a defective one, and then data is written on the information areas e and f that follow. On the other hand, FIG. 21(b) illustrates a situation where data that should have been written on the information area d is being written on the information area g that follows the information area f by the light beam spot formed by the objective lens. Since the write operation is performed shown in FIG. 21, it will not only take some time again to write the data that should have been written but also cause a loss of the continuity of that data as well after the presence of a defective area has been confirmed. In that case, it will take a lot of time to reconstruct the data, of which the continuity has been lost, during a read operation.

Thus, in order to overcome these problems that we spotted out in the related art, the present inventors perfected an optical read/write apparatus that can get a read/write operation done in a short time. Specifically, according to an embodiment of the present invention, a plurality of optical pickups are arranged so as to cross tracks on an optical storage medium and some of those optical pickups are used to perform a replacement write operation, thereby overcoming such problems. Hereinafter, the configuration and operation of this embodiment will be described.

1. Overall Configuration for Apparatus

An optical read/write apparatus as an embodiment of the present invention is an optical data streamer apparatus that uses an optical tape as an optical storage medium. Such an optical data streamer apparatus may be used to back up a huge quantity of data. In order to back up such an enormous quantity of data in a short time with the transfer rate increased, the optical data streamer apparatus includes a lot of optical pickups. It should be noted that the optical read/write apparatus of the present invention does not have to be an optical data streamer apparatus but may also be an optical disc apparatus or any other kind of apparatus. In the case of an optical disc apparatus, the optical storage medium is not an optical tape but an optical disc.

Figure 1A:
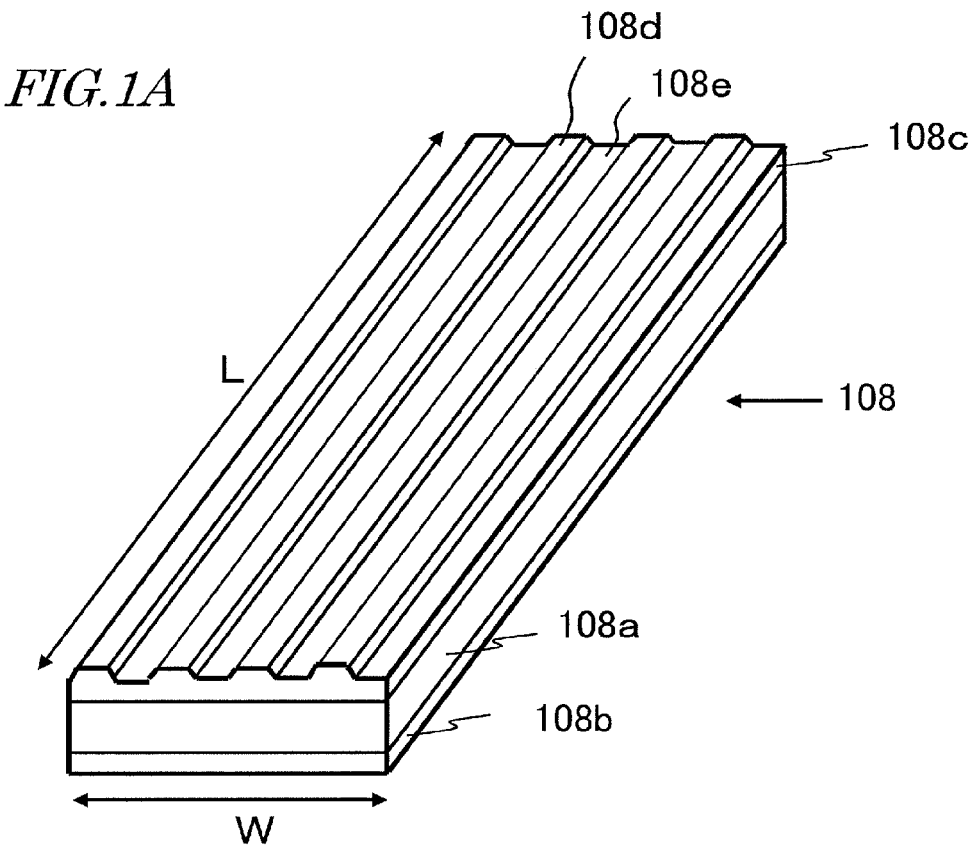
FIG. 1A is a perspective view schematically illustrating a portion of an optical tape 108 on a larger scale.

FIG. 1A is a perspective view schematically illustrating a portion of an optical tape 108 on a larger scale. The optical tape 108 may include a base film 108a, a back coating layer 108b that is adhered to the back surface of the base film 108a, and an imprint layer 108c that is supported by the base film 108a. On the upper surface of the imprint layer 108c, lands 108d and grooves 108e have been formed. Although not shown in FIG. 1A, a reflective film and a recording material film are deposited over the entire upper surface of the imprint layer 108c. The optical tape 108 is extended in the longitudinal direction L and may have a length of several hundred meters, for example. Its width W may be set within the range of a few millimeters to several centimeters, and its thickness may be within the range of a few micrometers to several ten micrometers.

It should be noted that FIG. 1A illustrating the optical tape 108 is not to scale. Actually, the optical tape 108 may have several hundreds, or an even greater number, of lands 108d and grooves 108e. In one embodiment, data is written on either the lands 108d or the grooves 108e. The lands 108d or the grooves 108e on which data is written will be referred to herein as "tracks", which may have a pitch of 0.2 µm to 0.4 µm, for example.

Figure 1B:
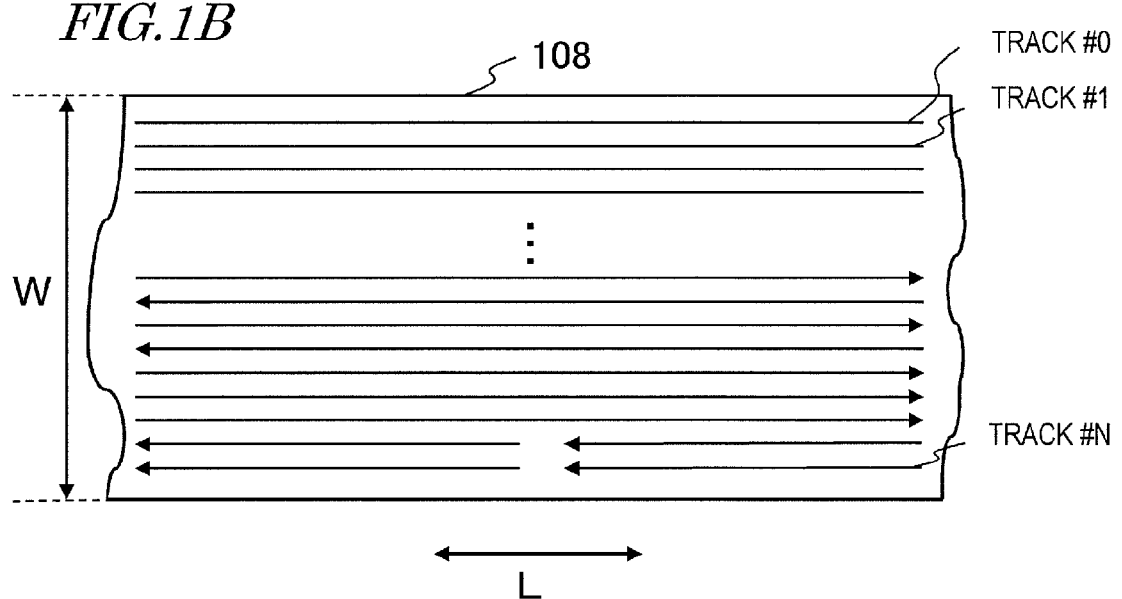
FIG. 1B is a plan view schematically illustrating a portion of the optical tape 108.

FIG. 1B is a plan view schematically illustrating a portion of the optical tape 108. As shown in FIG. 1B, N (which is an integer that is typically equal to or greater than 100) tracks #0 through #N have been formed to run in the longitudinal direction L. Some of those tracks illustrated in FIG. 1B are illustrated with an arrow. Each of those arrows indicates the direction in which data is written. That is to say, data can be written in multiple different directions on a single optical tape 108.

On the optical tape 108, a mark can be recorded optically by irradiating the tape 108 with a light beam. More specifically, such a mark is recorded on its recording material film. The light beam is radiated by an "optical pickup" that includes a light source and an objective lens that focuses the light beam emitted from the light source on the optical tape 108. When the optical pickup irradiates the optical tape 108 with a light beam, the irradiated portion of the optical tape 108 comes to have a different optical property such as a reflectance from the rest (i.e., the non-irradiated portion) of the optical tape 108. Such a portion, of which the optical property has changed in this manner, is called a "recorded mark".

In optical tape technologies, data can be read out from the optical tape 108 by irradiating the tape 108 with a relatively weak light beam with a constant intensity and detecting the light that has been modulated by, and reflected from, the optical tape 108. In writing data on the optical tape 108, data is written there by irradiating the optical tape 108 with a pulsed light beam, of which the optical power has been changed according to the data to be written, and locally changing the property of the recording material film.

When data is going to be written on the recording material film, the recording material film is irradiated with such a light beam, of which the optical power has been modulated as described above, thereby recording an amorphous mark on a crystalline recording material film. Such an amorphous recorded mark is left there by heating a portion of the recording material film that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the power of the light beam for writing data had an inappropriate level, then the recorded mark would have a deformed shape and sometimes it could be difficult to read the data as intended.

To read or write data from/on the optical tape 108, the light beam is to maintain a predetermined converging state on a target track. For that purpose, a "focus control" and a "tracking control" are performed. The "focus control" means controlling the position of an objective lens along a normal to the surface (i.e., information storage layer) of the optical tape 108 so that the focal point (or at least the converging point) of the light beam is located on the target track. On the other hand, the "tracking control" means controlling the position of the objective lens parallel to the information storage layer of the optical tape 108 and perpendicularly to the track so that the light beam spot is located right on the target track.

In order to perform such a focus control or a tracking control, the focus error or the tracking error is to be detected based on the light that has been reflected from the optical tape 108 and the position of the light beam spot is to be adjusted so as to reduce the error as much as possible. The magnitudes of the focus error and the tracking error are respectively represented by a "focus error (FE) signal" and a "tracking error (TE) signal", both of which are generated based on the light that has been reflected from the optical tape 108.

Figure 2A:
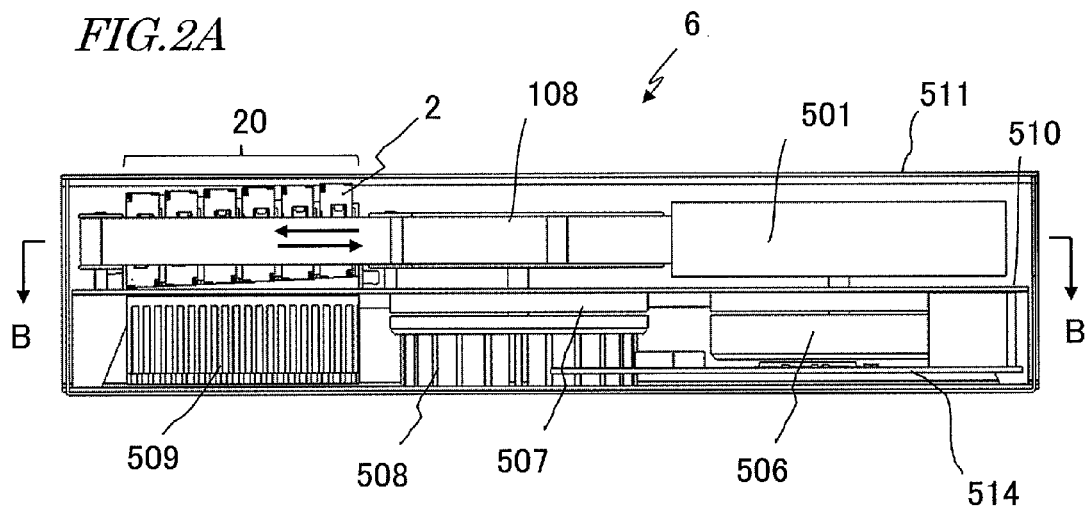
FIG. 2A illustrates an exemplary arrangement for an optical data streamer apparatus as a first embodiment of the present invention.
Figure 2B:
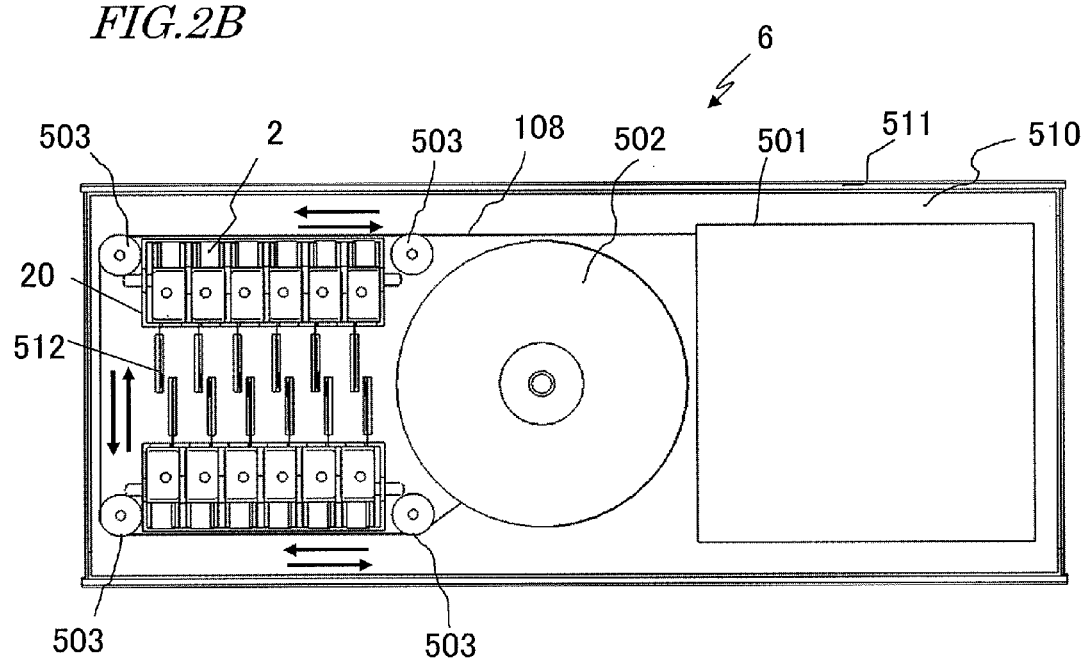
FIG. 2B is a cross-sectional view of the apparatus as viewed on the plane B-B shown in FIG. 2A.

FIG. 2A illustrates an exemplary arrangement for an optical data streamer apparatus 6 as an embodiment, and FIG. 2B is a cross-sectional view of the apparatus as viewed on the plane B-B shown in FIG. 2A. In the embodiment illustrated in FIG. 2A, the upside corresponds to perpendicularly upside, and the downside corresponds to perpendicularly downside. Thus, FIG. 2B illustrates an exemplary internal arrangement of this optical data streamer apparatus 6 as viewed from right over the apparatus.

FIGS. 2A and 2B illustrate a situation where the apparatus is loaded with a tape cartridge 501 in which the optical tape 108 is housed. The tape cartridge 501 is readily attachable and removable to/from the apparatus. And the optical data streamer apparatus 6 shown in FIGS. 2A and 2B is loaded with a selected one of multiple tape cartridges 501 that have the same shape.

The optical data streamer apparatus 6 of this embodiment includes a housing 511, a chassis 510 that is arranged inside of the housing 511, an optical pickup assembly 20 including a plurality of optical pickup 2 that are arranged so as to write data on the optical tape 108, and a radiator 509. Those optical pickups 2 are positioned by a positioning mechanism provided for the optical pickup assembly 20.

More specifically, this optical data streamer apparatus 6 includes motors 506 and 507 that make the optical tape 108 run, guide posts 503 and a winding spool 502. The motor 507 is mechanically interlocked with the winding spool 502 and turns the winding spool 502. On the other hand, the motor 506 is mechanically interlocked with the shaft of the tape cartridge 501 loaded and operates so as to wind the tape 108, which has been pulled out of the tape cartridge 501, back to the tape cartridge 501. Using these two motors 506 and 507, the tape 108 can run in both of the two directions that are indicated by the arrows.

The optical pickup assembly 20 includes a number of optical pickups 2, which are arranged in the direction in which the optical tape 108 runs. The optical pickup assembly 20 of this embodiment has upper and lower arrays of optical pickups 2 as shown in FIG. 2B. In the housing 511, arranged is a blower fan 508 that is mechanically coupled to the motor 507. That is why as the motor 507 turns, the blower fan 108 turns, too.

The optical pickups 2 are connected to flexible printed circuit boards (FPCs) 512 for optical pickups. This optical data streamer apparatus 6 further includes a circuit board (not shown) that is connected to the flexible printed circuit boards 512 and that includes circuit components that control the optical pickups 2 and the motors 506 and 507. Optionally, the optical pickups 2 and a circuit that would normally be mounted on another circuit board could be partially arranged on the flexible printed circuit boards 512.

Before the tape cartridge 501 is loaded into this optical data streamer apparatus 6, the optical tape 108 housed in the tape cartridge 501 has been wound around a spool (not shown). And when the tape cartridge 501 is loaded into the optical data streamer apparatus 6, the optical tape 108 is pulled out while being guided by a number of tape guide posts 503 and then wound around the winding spool 502. Each of the optical pickups 2 is fixed at a predetermined position with respect to the optical tape 108 so as to read and write information from/on the optical tape 108.

In this embodiment, twelve optical pickups 2 are provided and arranged so as to cover mutually different track ranges of the optical tape 108. Therefore, data can be read and written simultaneously by using a maximum of twelve optical pickups 2. It should be noted that the number of optical pickups provided for a single optical data streamer apparatus 6 does not have to be, and may be greater or smaller than, twelve. Also, in the example illustrated in FIG. 2B, six optical pickups 2 are arranged in the upper part on the paper and the other six optical pickups 6 are arranged in the lower part on the paper. However, their arrangement is just a matter of design and this arrangement does not have to be adopted. For example, twelve optical pickups may be arranged at regular intervals.

The motor 507 drives and turns the winding spool 502, thereby running the optical tape 108 in the forward direction. At the same time, the motor 507 also drives the blower fan 508. On the other hand, the motor 506 drives and turns a spool (not shown) in the tape cartridge 501, thereby running the optical tape 108 in the reverse direction. In the meantime, as the winding spool 502 is also driven by the optical tape 108, the blower fan 508 is turned, too. As the optical pickups 2 are thermally coupled to the radiator 509, the heat generated by the optical pickups 2 is transferred to the radiator 509.

During reading or writing, the optical tape 108 is run either in the forward direction by the feed motor 507 or in the reverse direction by the reverse motor 506, while those optical pickups 2 can perform a read/write operation on the optical tape 108 at the same time.

Hereinafter, an exemplary circuit configuration for an optical data streamer apparatus 6 according to this embodiment will be described with reference to FIG. 3.

The optical data streamer apparatus 6 illustrated in FIG. 3 includes an optical pickup assembly 20, motors 506 and 507, and circuit blocks that are electrically connected to the optical pickup assembly 20 and the motors 506 and 507 and that include a frontend signal processing section 520, an encoder/ decoder 530, a servo control section 550, a driver amplifier 560, and a CPU (system controller) 540 to be described below.

Figure 3:
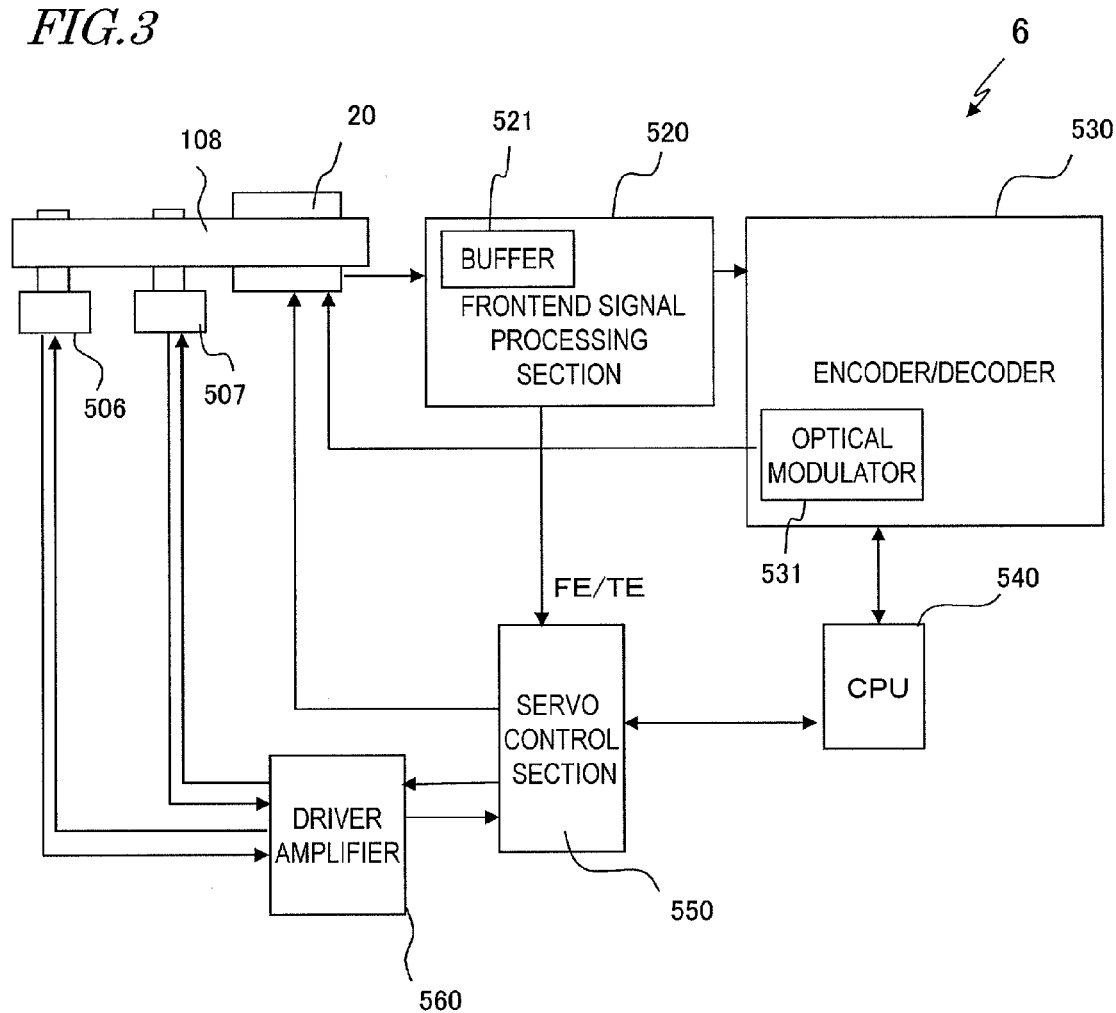
FIG. 3 illustrates an exemplary circuit configuration for an optical data streamer apparatus according to the first embodiment.

In the exemplary configuration shown in FIG. 3, the output of the optical pickup assembly 200 is supplied to the encoder/decoder 530 by way of the frontend signal processing section 520. In reading data, the encoder/decoder 530 decodes the data that is stored on the optical tape 108 based on the signal that has been generated by the optical pickup assembly 20. The encoder/decoder 530 includes an optical modulator 531. In writing data, the encoder/decoder 530 encodes the data to generate a signal to be written on the optical tape 108. In this description, this signal will be referred to herein as an "optical drive signal". The optical drive signal is supplied to the optical pickup assembly 20 by way of the optical modulator 531. Using this signal, the intensity of the light beam emitted from the light source of each optical pickup 2 is modulated so as to record a mark as intended on a target track on the optical tape 108.

The frontend signal processing section 520 generates a read signal based on the output of the optical pickup assembly 20, and also generates a focus error signal FE and a tracking error signal TE. The output signals of the optical pickup assembly 20 are temporarily stored in the buffer 521 of the frontend signal processing section 520. The frontend signal processing section 520 retrieves the output signals of the respective optical pickups 2 from the buffer 521 and generates a read signal through the processing to be described later. The read signal is then supplied to the encoder/decoder 530. The focus error signal FE and the tracking error signal TE are then supplied to the servo control section 550. In response, the servo control section 550 gets the motors 506 and 507 controlled by a driver amplifier 560. The servo control section 550 also gets the position of an objective lens controlled by a lens actuator in the optical pickup assembly 20. The encoder/decoder 530, the servo control section 550 and all the other components are controlled by the CPU 540. The respective circuit blocks illustrated in FIG. 3 can be implemented by assembling together integrated circuit elements, memories and other electronic parts, which form the respective sections, on a circuit board.

2. Optical Pickup's Configuration

FIG. 4 schematically illustrates an arrangement of an optical system for each of the optical pickups 2 of this embodiment.

As shown in FIG. 4, the optical system of each optical pickup 2 includes a light source 110, a diffraction grating 111, a beam splitter 103, a wave plate 104, a condenser lens 105, a mirror 106, an objective lens 107, a detector lens 102, and a photodetector 101. An optical drive signal is supplied from the optical modulator 531 to the light source 110. The light source 110 is typically a semiconductor laser and is configured to emit a light beam, of which the intensity has been modulated in accordance with the optical drive signal.

The light emitted from the light source 110 gets diffracted by the diffraction grating 111 and split mainly into a zero-order light beam and ± first-order light beams. The zero-order light beam is used to read and write data normally, while the ± first-order light beams are used to verify the data that has been written with the zero-order light beam or to detect any defect on a track. In this description, the zero-order light beam will be sometimes referred to herein as a "main beam" or a "write beam", while the ± first-order light beams will be sometimes referred to herein as "sub-beams" or "read beams".

As the diffraction grating 111, any optical element that can split the incoming light into a write beam and a read beam (which will be referred to herein as a "light-splitting element") may be used. For example, the diffraction grating 111 may be a tapered mirror or a prism. In that case, either surface reflected light or transmitted light may be used as a main beam and the light that has been reflected from the inner surface with a taper angle may be used as a sub-beam.

The zero-order and ± first-order light beams that have been produced through diffraction are transmitted through the beam splitter 103, the wave plate 104, the condenser lens 105 and the mirror 106 and then condensed by the objective lens 107. As a result, three condensed light beam spots (i.e., a main spot and two sub-spots) are formed on the same track on the optical storage medium (optical tape) 108. In this case, the efficiency ratio of the diffraction grating is set so that the intensity (or the quantity) of the ± first-order light beams is much less than that of the zero-order light beam.

The main beam and two sub-beams that have been reflected from the optical storage medium 108 are transmitted through the same optical system again and then incident on the photodetector 101, which is designed to output electrical signals representing the respective quantities of the incident light beams.

Figure 5A:
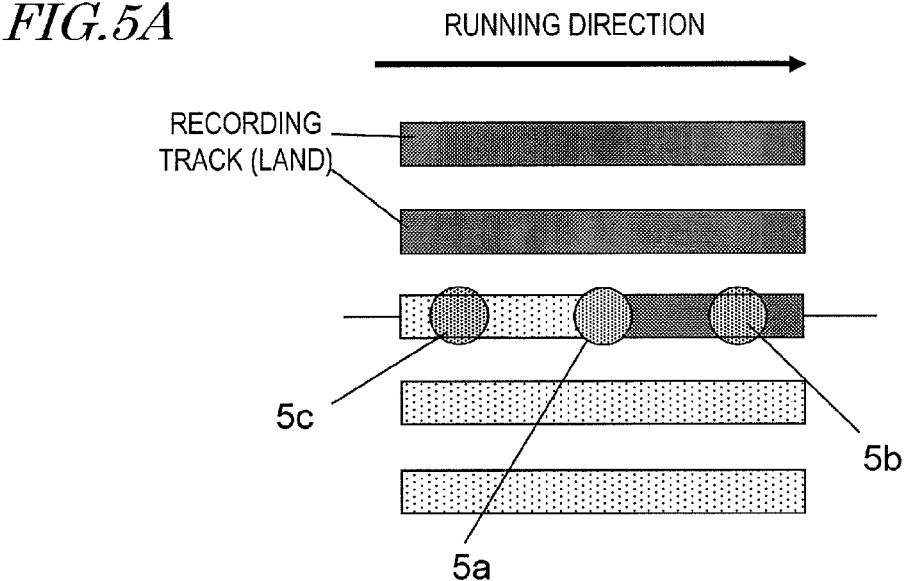
FIG. 5A illustrates light beam spots formed by the optical read/write apparatus on an optical storage medium and FIG. 5B illustrates a configuration for a photodetector in the optical read/write apparatus.

FIG. 5A illustrates an exemplary arrangement of the light beam spots on the storage layer of the optical storage medium 108. In FIG. 5A, the main spot 5a left by the zero-order light beam functions as either a write spot or a read spot and is used to read or write a signal (or data) from/on the storage medium 108. On the other hand, the two sub-spots 5b and 5c left by the ± first-order light beams are used as read spots to verify the data that has been written with the main spot.

During a write operation, the main spot 5a and the sub-spots 5b and 5c are formed on the same track, and the storage medium 108 is scanned with these spots in the direction that is opposite to the running direction indicated by the arrow in FIG. 5A. Actually, however, these light beam spots are fixed with respect to the apparatus and it is the track of the optical storage medium 108 that moves in the direction indicated by the arrow. As a result, the respective light beam spots appear to move with respect to the optical storage medium 108. Such a relative movement of the main spot 5a on a track of the optical storage medium 108 will be referred to herein as "scanning the optical storage medium with a write beam". In the same way, such a relative movement of the sub-spot 5b, which follows the main spot 5a, on the track of the optical storage medium 108 will be referred to herein as "scanning the optical storage medium with a read beam".

In reading or writing data, of the two sub-spots, the sub-spot 5b of the scanning light beam follows the main spot 5a, and therefore, is affected by a mark that has been recorded with the main spot 5a to have the quantity of its reflected light modulated. As a result, the signal representing the reflected light that has left the sub-spot 5b includes not only a component modulated by the optical drive signal but also a component modulated by the recorded mark as well. On the other hand, since the sub-spot 5c of the scanning light beam goes ahead of the main spot 5a, its reflected light includes no information about a recorded mark as long as no data has been written in advance on the optical storage medium 108. That is why the signal representing the reflected light that has left the light beam spot 5c has only a component modulated by the optical drive signal and has no component modulated by the recorded mark. For that reason, if the optical storage medium 108 is running in the direction indicated by the arrow in FIG. 5A, it can be determined, by comparing the signal representing the reflected light that has left the light beam spot 5c to the optical drive signal, whether or not there is any defect on the track of the optical storage medium 108.

Also, even if there was no defect on the track, data could not be written as intended for some other reason. That is why according to this embodiment, it is determined, based on the reflected light that has left the light beam spot 5b, whether or not the data has been written accurately.

If the running direction of the optical storage medium 108 reverses, then the light beam spots 5b and 5c also change roles with each other. That is to say, in that case, it is determined based on the reflected light that has left the light beam spot 5b whether or not there is any defect on the track on the optical storage medium 108. And it is determined based on the reflected light that has left the light beam spot 5c whether or not data has been written there accurately.

3. Photodetector's Configuration

Figure 5B:
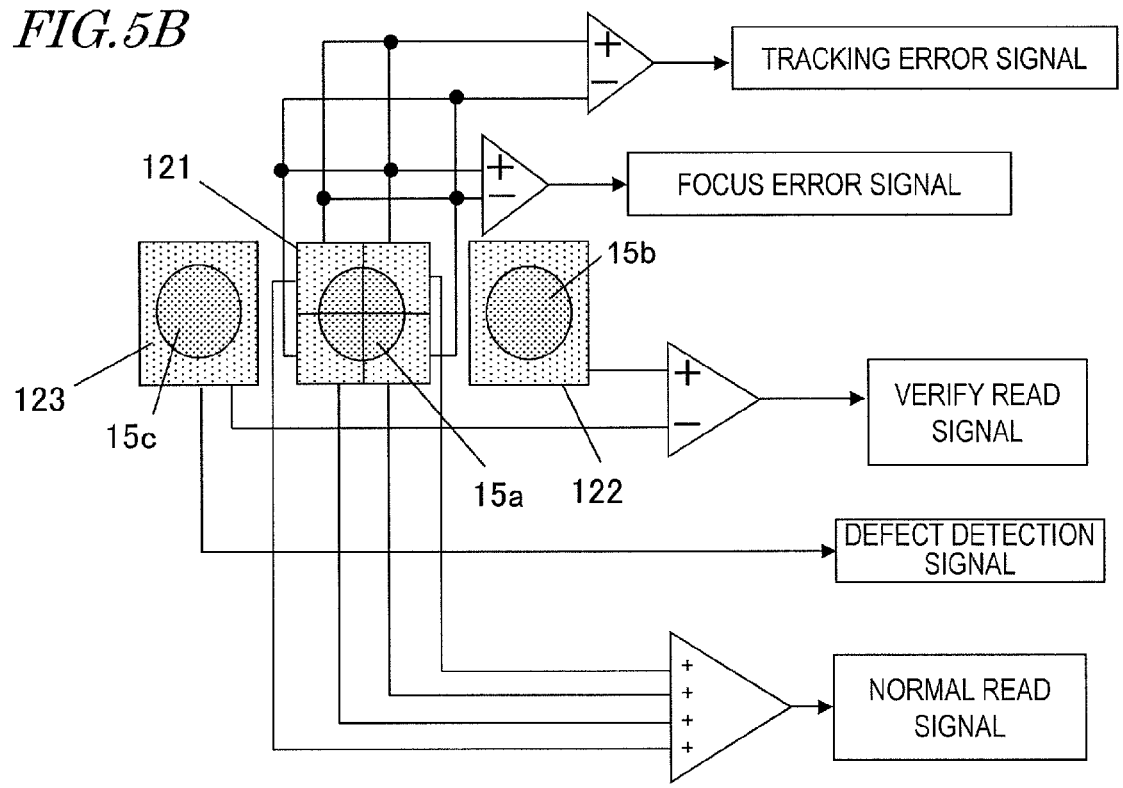

FIG. 5B illustrates the arrangement of light receiving elements in the photodetector 101, which includes a main light receiving element 121 and two sub-light receiving elements 122 and 123. Each light receiving element is, for example, comprised of a photodiode.

The main light receiving element 121 with four divided photosensitive areas as shown in FIG. 5B is arranged to receive the zero-order light beam (i.e., the reflected light 15a that has left the main spot 5a). The magnitude of astigmatism produced by the detector lens 102 shown in FIG. 4 changes with the degree of defocusing. Thus, a focusing state can be detected with the focus error signal shown in FIG. 5B. A tracking state is detected with the tracking error signal by the push-pull method shown in FIG. 5B. The focus error signal and the tracking error signal are then supplied to the servo control section 550 via the frontend signal processing section 520.

On the other hand, the sub-light receiving elements 122 and 123 are arranged to receive reflected light 15b that has left the sub-spot 5b and reflected light 15c that has left the sub-spot 5c, respectively. As shown in FIG. 5B, by calculating the difference between the respective outputs of the sub-light receiving elements 122 and 123, a verify read signal can be generated. The verify read signal is stored in the buffer 521 of the frontend signal processing section 520. Also, the output signal of the sub-light receiving element 123 is used as a signal indicating whether or not there is any defect on the track (which will be referred to herein as a "defect detection signal"). This respect will be described in detail later.

If just a normal read operation is going to be performed without performing any verify operation, then the output of the main light receiving element 121 may be used without using the output of the sub-light receiving element 122 or 123. In the following description, a signal representing the sum of the outputs of the four divided areas of the main light receiving element 121 will be sometimes referred to herein as a "normal read signal".

Next, it will be described with reference to FIG. 6 what signals are generated while a verify operation is being performed. Portion (a) of FIG. 6 shows an exemplary waveform of an optical drive signal. Portion (b) of FIG. 6 schematically illustrates the shapes of marks to be recorded on a track. Each of these marks is recorded on an area where the main spot 5a is located when the optical drive signal is high.

Portions (c) and (d) of FIG. 6 show the waveform of a signal representing the reflected light of the plus (+) first-order diffracted light beam that has left the sub-spot 5b and that of a signal representing the reflected light of the minus (−) first-order diffracted light beam that has left the sub-spot 5c, respectively. As can be seen from portion (c) of FIG. 6, the waveform of the reflected light that has left the sub-spot 5b is affected by a recorded mark because the spot of a light beam that has been modulated with the optical drive signal has moved on a track with the recorded mark. On the other hand, as can be seen from portion (d) of FIG. 6, the waveform of the reflected light that has left the sub-spot 5c is not affected by any recorded mark because the spot of a light beam that has been modulated with the optical drive signal has moved on a track with no recorded marks.

Portion (e) of FIG. 6 shows the waveform of a differential signal that is obtained by subtracting the signal representing the reflected light that has left the sub-spot 5c from the signal representing the reflected light that has left the sub-spot 5b. This waveform includes information about the positions and shapes of the recorded marks, i.e., read information. Thus, it can be seen that a read signal representing the pattern of recorded marks can be generated by calculating the difference between the two light receiving elements 122 and 123. The sign of the differential signal representing the difference between the light receiving elements 122 and 123 is inverted if the direction of scanning the optical storage medium 108 with the light beam spots reverses.

As described above, according to this embodiment, a verify read signal is generated by calculating the difference between the light receiving elements 122 and 123. However, the verify read signal can also be generated by a different method. For example, the verify read signal may also be generated by dividing the output of the light receiving element 122 by that of the light receiving element 123. Alternatively, the output of the light receiving element 123 may be replaced with a signal obtained by detecting a light beam yet to be incident on the optical storage medium 108. Such a configuration is realized by replacing the mirror 106 shown in FIG. 4 with a half mirror and by arranging another photodetector behind that half mirror.

4. Optical Pickup Assembly's Configuration

FIG. 7 is a schematic representation illustrating an exemplary configuration for an optical pickup assembly 20 comprised of multiple optical pickups according to this embodiment. Unlike the example shown in FIGS. 2A and 2B, twelve optical pickups 2A through 2L are arranged obliquely to the track direction at regular intervals.

As shown in FIG. 7, each of those optical pickups 2A through 2L includes an objective lens driver (i.e., a lens actuator) 4 on which an objective lens 107 is mounted. The objective lens driver 4 is configured to move the objective lens 107 to any arbitrary position within its movable range perpendicularly to the track direction (i.e., in the tracking direction) in accordance with an instruction given by a CPU (system controller) 540.

The data storage area of the optical storage medium 108 of this embodiment is evenly divided in the tracking direction into twelve areas, to each of which a single optical pickup is allocated. Each area has a plurality of tracks (e.g., a few ten to several hundred tracks). Typically, those areas are configured to have the same number of tracks each. But those areas may have mutually different numbers of tracks.

As shown in FIG. 7, those twelve optical pickups 2A through 2L are arranged stepwise across the track running direction of the optical storage medium 108. By adopting such an arrangement, the size of the apparatus can be reduced in the width direction of the optical storage medium 108. Although the twelve optical pickups 2A through 2L are arranged at regular intervals in the example illustrated in FIG.

7, such an arrangement is just an example and does not always have to be adopted. For example, those optical pickups may be arranged so as to cross the tracks at right angles.

In this embodiment, the optical pickup 2L, which is arranged at the tail with respect to the running direction of the optical storage medium 208, performs a replacement write operation if data has not been written successfully by any other optical pickup 2A through 2L. When instructed by the system controller 540 to perform a replacement write operation of the data, the optical pickup 2L writes that data on the replacement write area 1L1.

On the optical storage medium 108, the replacement write area 1L1 is a storage area dedicated to storing only data concerning replacement write processing. The replacement write area 1L1 is part or all of the track range 1L allocated to the optical pickup 2L.

In this embodiment, the replacement write processing is carried out if the system controller 540 finds the data that has been written by any of the optical pickups 2A through 2B inaccurate or detects a defect in an area where data is going to be written by any of those optical pickups 2A through 2K. When it is determined that the replacement write processing be done, the frontend signal processing section 520 instructs the optical pickup 2L in charge of the replacement write processing to write that data.

5. Read/Write Operation

Hereinafter, it will be described how the optical read/write apparatus 6 performs a read/write operation.

When a read/write operation is performed, the optical storage medium 108 starts to run and a laser beam is emitted from the light source 110 of each of those optical pickups 2A through 2L in accordance with an instruction given by the system controller 540. The laser beam emitted is condensed by the objective lens 107 onto the optical storage medium 108 and forms a light beam spot there, thereby performing a read/write operation. In performing a write operation, data is written on a data storage area on the optical storage medium 108 with the optical power of the light beam increased. On the other hand, in performing a read operation, data is read by detecting, with the optical power of the light beam decreased, the light reflected from a mark that has been recorded on the optical storage medium 108.

FIG. 8 illustrates how data has been written on the optical storage medium 108 of this embodiment. Specifically, FIG. 8 is a schematic representation illustrating a situation where data has not been written successfully on a location 130 on a track 1K where data is going to be written by the optical pickup 2K. In the state shown in FIG. 8, a main spot 5a is formed on a single track in each of the track ranges 1K and 1L of the optical storage medium 108. In FIG. 8, illustration of the sub-spots 5b and 5c is omitted. Also, on that track in the track range 1K, marks 120 have been recorded by the main spot 5a being formed by the optical pickup 2K.

As shown in FIG. 8, if data has not been written successfully on that location 130 on the optical storage medium 108 due to the presence of a defect or for any other reason, then that data is written on an alternative location 140 in an area 1L1 instead. It is determined based on the reflected light beams that have left the sub-spots 5b and 5c (not shown) whether or not data has been written successfully. That is to say, an error is detected based on the difference between the waveform representing a verify read signal shown in portion (e) of FIG. 6 and the waveform to be predicted based on an optical drive signal when a mark is recorded.

Also, similar replacement write processing is carried out if a defect has been detected in that location 130 before it is sensed that the data has been written on the location 130 with an error. If there is a defect on any location on a track, then the waveform of a defect detection signal, representing the minus first-order light beam shown in portion (d) of FIG. 6, shifts from the waveform predicted based on an optical drive signal. For that reason, it can be determined, based on such a shift of the waveform of the defect detection signal, whether or not there is any defect there.

If any defect or write error has been spotted by detecting the reflected light beams that have left the sub-spots 5b and 5c, the system controller 540 performs the replacement write processing. In that case, the system controller 540 puts feedback on the optical pickup 2L and instructs the optical pickup 2L to write that data that should have been written by the optical pickup 2K (i.e., the recorded mark 140) on one track in the replacement write area 1L1.

In the example illustrated in FIG. 8, a defect or write error is supposed to be detected from some location in the track range 1K on which data is going to be written by the optical pickup 2K. A similar operation will be performed on a track range allocated to any other optical pickup 2A through 2J, too.

FIG. 9 is a flowchart showing an exemplary procedure of the replacement write processing to be performed by the system controller 540 during a write operation. First of all, in Step S901, the system controller 540 instructs the motors 506 and 507 to start running the optical storage medium 108 and then instructs each optical pickup to write data. While getting the data written, the system controller 540 reads various kinds of signals that have been detected by the photodetector 101 of each optical pickup (in Step S902). Next, based on a defect detection signal or a verify read signal that has been read, the system controller 540 determines whether or not there is any defect or write error (in Step S903). If the answer is YES, the system controller 540 instructs the optical pickup 2L in charge of the replacement write processing to write the data that should have been written on that location that has a defect or write error somewhere else (in Step S904). This series of processing steps is carried out a number of times until the system controller 540 confirms in Step S905 that the last piece of data has been written successfully.

In the example shown in FIG. 9, the system controller 540 is supposed to determine, in Step S903, whether any defect has been spotted or not AND whether any write error has been detected or not. However, the system controller 540 may make only one of these two decisions.

As described above, according to this embodiment, while the optical storage medium 108 is running, the optical pickup 2L, which is one of the twelve optical pickups 2A through 2L, is ready to perform replacement write processing. Thus, it can be determined, through a verify operation, whether or not the data has been written accurately by the other eleven optical pickups 2A through 2K and whether or not any defect has been spotted on the optical storage medium 108. Particularly, by arranging the optical pickup 2L in charge of the replacement write processing at the tail, even if data has been written with an error, replacement write processing is quickly carried out by the optical pickup 2L, and therefore, the written data is much less likely to lose its continuity. As a result, the read/write operation can get done in a much shorter time, which is highly advantageous.

It should be noted that if the running direction of the optical storage medium 108 shown in FIG. 7 reverses, then the optical pickup 2A will be located at the tail with respect to the running direction of the optical storage medium 108. In that case, the optical pickup 2A may be in charge of the replacement write processing and an area 1A1, which forms part of the track range 1A allocated to the optical pickup 2A, may be used as the replacement write area. By adopting such an arrangement, even if the running direction of the track reverses, the written data hardly loses its continuity, which is beneficial.

6. Examples of Written Data

Next, examples of the data written by the optical pickups 2A through 2L will be described. To write data solidly and securely, the write operation may be performed in the following manner according to this embodiment.

FIG. 10A schematically illustrates how the optical read/write apparatus 6 performs a write operation. In FIG. 10A, the data written on some track ranges 1H through 1L of the optical storage medium 108 are identified by reference signs. In this example, the data that the user has requested the apparatus to write (which will be sometimes referred to herein as "user data") is divided into a number of elements, which are then allocated to a plurality of optical pickups. For instance, in the example illustrated in FIG. 10A, each of user data A, B, C, etc. is divided into a number of elements, each of which has a minimum unit data length (of 8 bits, for example) and which are allocated to a plurality of optical pickups 2H through 2K. Specifically, the data A is divided into four elements A1 through A4, which are allocated to mutually different optical pickups 2H through 2K and which are written in parallel with each other. In the same way, the data B and C are each divided into four elements B1 through B4 and C1 through C4, which are also written in parallel with each other.

In this example, the system controller 540 instructs the optical pickups 2H through 2L to write parities PA1 through PA4 associated with the elements A1 through A4, too. These parities PA1 through PA4 are error correction codes that are used to fill any missing part of those elements A1 through A4 of the user data A. The error correction codes may be generated by a method that is adopted in a known optical disc drive, for example. Likewise, parities PB1 through PB4 associated with the elements B1 through B4 and parities PC1 through PC4 associated with the elements C1 through C4 are also written.

In the example illustrated in FIG. 10A, one parity is generated for each data element A1, A2, etc. However, parities may also be generated and written by a method that is adopted in the RAID (redundant arrays of inexpensive disks) technology. For example, as is done in RAID level 5, a parity may be generated for each group of data elements, and a plurality of parities thus generated may be written on multiple track ranges separately. According to such a method, even if some optical pickup went out of order, data could still be read, and therefore, the fault tolerance can be increased.

In this case, the system controller 540 performs a verify operation while writing data by adopting the DRAW technology. However, if the write operation went wrong, then the system controller 540 would perform the replacement write processing as described above. The replacement write processing is carried out by getting replaced location information and replacement information written as a set on a predetermined track in the dedicated track range 1L by the optical pickup 2L in charge of the replacement write processing. In this description, the replacement information refers herein to a piece of information indicating the value of data that should have been written, and the replaced location information refers herein to a piece of information about the location where the data should have been written. For example, each piece of replaced location information may be a combination of information identifying the track and information about a location on that track.

In the example illustrated in FIG. 10A, B2' has been written on the location where B2 should have been written. Thus, a write error is detected based on the output signal of the optical pickup 2I that scans that location. In this case, the system controller 540 gets B2 as replacement information and address information ADD, which is a piece of replaced location information indicating the track and a specific location on that track where B2 should have been written, written by the optical pickup 2L in charge of the replacement write processing. As a result, the error data B2' can be repaired with the replacement information B2 when a read operation is performed. Although parities associated with the replacement information B2 and the replaced location information ADD are not shown in FIG. 10A, parities are actually added to those pieces of information, too.

In this example, every time it turns out that no replacement write processing has been performed on a data range of a predetermined length, a piece of information NO-RE indicating that data has been written successfully is recorded. As this piece of information NO-RE clearly indicates that data has been written accurately in that range, the reliability of the data written can be increased. Optionally, that piece of information NO-RE indicating that a write operation has been done successfully may be recorded when no replacement write processing is performed at all.

As described above, in the exemplary configuration shown in FIG. 10A, the data to be written is divided into multiple pieces, which are then allocated to multiple different optical pickups, thereby getting those pieces of data written in parallel. As a result, the data can be written more accurately and can also be reconstructed more easily when read, which is beneficial.

In the example illustrated in FIG. 10A, data is supposed to be written in parallel only on the track ranges 1H through 1K. However, this is just an illustrative example. Actually, data is written in parallel on the track ranges 1A through 1G, too. If the writing method such as the one shown in FIG. 10A is adopted, those divided pieces of data may be written in parallel by at least two optical pickups.

FIG. 10B is a schematic representation illustrating a situation where those divided pieces of user data are written using the optical pickups 2A through 2L. In this example, pieces of user data are written by all of those optical pickups 2A through 2K but the optical pickup 2L in charge of the replacement write processing. Also, in FIG. 10B, the portions where data has been written with the main spot 5a on the tracks are shadowed and illustration of the sub-spots 5b, 5c is omitted.

In this example, if the optical pickup 2C in charge of the track range 1C has detected a location 130 with either a defect or a write error, then the optical pickup 2L writes replacement information 140 on a track in the track range 1L. According to the example illustrated in FIG. 10A, the replaced location information ADD is also written there. In addition, the information NO-RE indicating that data has been written successfully on a data range without performing replacement write processing may also be written. By adopting such a writing method, user data can be written efficiently. On top of that, even if a defect or a write error has been spotted, the replacement information is written so close to the location where the data should have been written that the continuity of the data can be maintained. Moreover, the data can be reconstructed easily when a read operation is performed.

7. Read Operation

Next, it will be described how a read operation may be performed on an optical storage medium 108 on which data has been written by the method described above. In the example to be described below, the data is supposed to be read by the optical read/write apparatus 6 described above. However, the data may also be read by any other apparatus (e.g., a read-only apparatus with no write function).

In performing a read operation, the optical read/write apparatus 6 gets the storage area of the optical storage medium 108 irradiated with a relatively weak light beam by the optical pickups 2A through 2L. As there is no need to perform the verify operation during reading, the read signal can be obtained using only a signal representing the reflected light of a zero-order diffracted light beam without using the signals representing the reflected light beams of the ± first-order diffracted light beams.

FIG. 11 illustrates basically how to perform a read operation according to this embodiment. Using those optical pickups 2A through 2L, the optical read/write apparatus 6 retrieves data from multiple locations on the optical storage medium 108 at the same time. In FIG. 11, only the optical pickups 2H through 2L are illustrated as in FIG. 10A. However, each of the other optical pickups not shown in FIG. 11 also retrieves data from its own track range. Then, the data that has been retrieved by those optical pickups 2A through 2L are stored in the buffer 521 shown in FIG. 3.

The frontend signal processing section 520 reconstructs the read data based on the data that is stored in the buffer 521 and that may include replacement information and replaced location information. Using those pieces of information, the frontend signal processing section 520 can repair portions where write errors have occurred.

FIG. 12 illustrates conceptually what data is stored in the buffer 521 and what read data is reconstructed when a read operation is performed using the configuration shown in FIG. 11. The data stored in the buffer 521 includes not only ordinary data A1 through C4 but also NO-RE indicating that data has been written successfully, error data B2', replaced location information ADD, replacement information B2, and parity data PA1 through PC4 as well. Using the parity data PA1 through PC4, the frontend signal processing section 520 makes error correction processing on their associated data elements A1 through C4. The error correction processing may be made by the method that is used in known optical disc drives, for example. By also using the replaced location information ADD and the replacement information B2, the frontend signal processing section 520 repairs the error data B2'.

FIG. 13 is a flowchart showing how a read operation may be performed according to this embodiment. To start a read operation, first of all, the system controller 540 instructs each of those optical pickups to read data (in Step S1301). Next, the system controller 540 sequentially stores the data that has been read in the buffer 521 in Step S1302 and then sequentially retrieves them one after another in Step S1303. In the meantime, the system controller 540 makes error correction processing on the respective data elements A1, A2, etc. in Step S1304. The error correction processing may be made by the method that is used in known optical disc drives, for example. Subsequently, the system controller 540 determines whether or not there is any replacement information in the buffer (in Step S1305). If the answer is NO, the system controller 540 extracts the data elements from the buffer 521 as they are and arranges them in Step S1307. On the other hand, if the answer is YES, then the system controller 540 repairs the data at the location indicated by its replaced location information with the replacement information in Step S1306 and then extracts and arranges those data elements in Step S1307. And the system controller 540 will perform the same series of processing steps S1303 through S1307 over and over again until the system controller 540 confirms in Step S1308 that the last piece of data has been read.

By performing these processing steps, multiple pieces of information including the replacement information can be retrieved in parallel from the buffer 521 and data can be reconstructed based on the replacement information. As a result, even if there is an error in the data stored, the error data can be repaired easily and the data can be read in a short time.

It should be noted that the procedure of the read operation shown in FIG. 13 is just an example and that the read operation does not always have to be performed exactly in this procedure. For example, if no error correction codes are written on the optical storage medium 108, the processing step S1304 can be omitted. Optionally, some of those processing steps may be changed with each other or may even be carried out in parallel with each other as long as it is permitted.

(Embodiment 2)

Hereinafter, an optical read/write apparatus as a second embodiment of the present invention will be described. Unlike the first embodiment described above, in the optical read/write apparatus of this embodiment, meander detecting data is written on the optical storage medium 108 and the meandering state of the optical storage medium 108 is detected based on that data. Thus, the following description of this second embodiment will be focused on those differences from the first embodiment and their common features will not be described all over again to avoid redundancies.

FIG. 14 illustrates a configuration for an optical read/write apparatus according to this embodiment. In FIG. 14, any component also shown in FIG. 7 and having substantially the same function as its counterpart is identified by the same reference numeral. As in the first embodiment described above, if any of the other optical pickups 2A through 2K has failed to get a write operation done successfully, then the optical pickup 2L, which is arranged at the tail with respect to the running direction of the optical storage medium 108, also performs in this embodiment replacement write processing on the replacement write area 1L1.

According to this embodiment, the optical pickup 2A, which is arranged at the top of the twelve optical pickups 2A through 2L with respect to the running direction of the optical storage medium 108, detects the meandering of the optical storage medium 108.

In this embodiment, meander detecting marks 11A have been recorded in advance on the track range 1A of the optical storage medium 108. During reading or writing, the system controller 540 makes the optical pickup 2A scan those recorded marks 11A, thereby detecting the magnitude of a positional shift in the tracking direction due to the meandering of the optical storage medium 108 running. Then, the system controller 540 feeds back the magnitude of positional shift detected to the other eleven optical pickups 2B through 2L, thereby getting the tracking position corrected by their objective lens driver 4. By correcting the tracking position in this manner, data can be written with more stability, and the quality of the data stored can be improved, which is highly advantageous.

It should be noted that when the running direction of the optical storage medium 108 shown in FIG. 14 reverses, the optical pickup 2L will be located at the top with respect to the running direction of the optical storage medium 108. In that case, if meander detecting marks 11L have been recorded in advance on the track range 1L of the optical storage medium 108, then the optical pickup 2L can detect the magnitude of a positional shift in the tracking direction due to the meandering of the optical storage medium 108 running. That is why if the meander detecting marks 11A and 11L have been recorded in advance on both of the track ranges 1A and 1L of the optical storage medium 108, the meandering can be detected with no problem irrespective of the running direction of the optical storage medium 108.

In this case, the meander detecting data does not have to be written on the track range 1A, 1L at either end but may also be written on any other track range. In that case, the meandering is detected by the optical pickup that takes charge of that track range. Also, the meander detecting data may be information about a track number that has been written in advance at regular intervals on each track, for example. Such a piece of information may be written on not only the track range 1A, 1L at either end but also any other track range as well. And if such information is used as meander detecting data, the meandering may be detected by any of those optical pickups.

Naturally, advantageous effects are also achieved by this embodiment, as well as by the first embodiment described above, thanks to other structural features.

In the first and second embodiments of the present invention described above, the optical pickup in charge of the replacement write processing is supposed to be the optical pickup 2A or 2L that is located at the tail with respect to the running direction of the optical storage medium 108. However, any of those optical pickups 2A through 2L may be in charge of the replacement write processing. For example, the middle one 2F of those twelve optical pickups 2A through 2L may take charge of the replacement write processing. Optionally, in order to improve the quality and reliability of the write operation on the optical storage medium 108, not only the optical pickup 2A or 2L but also its adjacent optical pickup 2B or 2K may take charge of the replacement write processing as well as shown in FIG. 15. That is to say, not just the storage area 1A1 or 1L1 but also the storage area 1B1 or 1K1 may be used as replacement write areas.

Also, in the embodiments described above, the verify operation is supposed to be performed by detecting a signal representing the reflected light that has left the sub-spot 5b or 5c shown in FIG. 5A. However, a configuration that does not use diffraction may also be adopted. For example, the light source 110 may be replaced with a 2LD light source 210 with two laser diodes that emit laser beams of the same wavelength as shown in FIG. 16. The 2LD light source 210 includes a main laser diode 210a that emits a main beam for writing and a sub-laser diode 210b that emits a sub-beam for reading. These two laser diodes 210a and 210b are arranged so as to shift from each other perpendicularly to the light-emitting direction. The light beams that have been emitted from these laser diodes are condensed by the objective lens 107 onto the same track on the optical storage medium 108, thereby forming at least two condensed beam spots (i.e., a main spot and sub-spot) there. The reflected light beams that have left the main spot and the sub-spot are transmitted through the optical system and then detected by the photodetector 101.

According to the configuration shown in FIG. 16, no components modulated with the optical drive signal are superposed on any sub-beam, and therefore, a signal representing the reflected light of a sub-beam may be used as a signal for verification as it is. Since no sub-spot moving preceding the main spot is formed in this exemplary configuration, it can be determined based on a signal representing the reflected light of the main beam whether or not there is a defect on the track. When the running direction of the optical storage medium 208 reverses, the main laser diode 210a and the sub-laser diode 210b may change their roles with each other.

If the 2LD light source 210 is used, two objective lenses 107 may be used as well. As shown in FIG. 17, two objective lenses 107a and 107b may be built in each optical pickup 2 and may be used for writing and for reading, respectively, as shown in FIG. 17.

In the first and second embodiments of the present invention described above, the track range in which the read/write operation can be performed is supposed to vary from one optical pickup to another. However, this is just an example and such a configuration does not always have to be adopted. Optionally, the track range covered by one optical pickup and the one covered by another optical pickup may share some tracks with each other. For example, when one optical pickup covers a track range, another optical pickup that covers the same track range may be arranged behind it. With such a configuration adopted, after data has been written by the former optical pickup, that data may be read by the latter optical pickup, for example.

Also, in the first and second embodiments described above, it is determined definitely what optical pickup is in charge of the replacement write processing, and that optical pickup is prohibited from writing ordinary user data. However, such a configuration does not always have to be adopted. Alternatively, the apparatus may also be configured so that if the system controller 540 finds the data that has been written of any of the multiple optical pickups inaccurate or spots a defect on a location where data is going to be written by one of those optical pickups, then that data may be written on a different track from the originally selected one by another optical pickup.

(Embodiment 3)

Hereinafter, an optical read/write apparatus and read apparatus as a third embodiment of the present invention will be described.

An optical read/write apparatus according to this embodiment also has the physical configuration shown in FIGS. 2A, 2B and 3 just like the optical read/write apparatus 6 of the first embodiment described above, but does not perform replacement write processing, which is a major difference from the first embodiment. Thus, the following description of this third embodiment will be focused on those differences from the first embodiment and their common features will not be described all over again to avoid redundancies. In the following description, any component having substantially or quite the same function as its counterpart of the first embodiment will be identified by the same reference numeral.

In this embodiment, as no replacement write processing is performed, each and every optical pickup 2A through 2L can write user data, and no replacement information or replaced location information is written. That is to say, even the optical pickup 2L can also write the same information as any other optical pickup as shown in FIG. 18. In the example illustrated in FIG. 18, data A is written separately as five pieces of data A1 through A5 and their associated parities PA1 through PA5 are also written. The same can be said about the data B and C, too.

Although the optical read/write apparatus of this embodiment does not perform replacement write processing, the data to write is divided into multiple pieces to be written in parallel by multiple optical pickups. That is why the write operation can get done in a short time. In addition, by performing the write operation in this manner, the time it takes to get a read operation done can also be shortened.

In the example illustrated in FIG. 18, the given data is divided into five pieces, which are allocated to five optical pickups 2H through 2L, respectively. However, this is only an illustrative example and it may be determined arbitrarily how many pieces the data is divided into. To say the least, the system controller 540 may be configured to divide the data to write into multiple pieces and to make at least two of the multiple optical pickups write those pieces of data in parallel.

Next, a read apparatus for performing a read operation on an optical storage medium 108, on which data has been written separately on multiple track ranges by the optical read/write apparatus of this embodiment, will be described. This read apparatus may be the same as, or different from, the optical read/write apparatus described above. Just like the optical read/write apparatus 6 of the first or second embodiment, the read apparatus also has the same physical configuration as the one shown in FIGS. 2A, 2B and 3. However, the read apparatus does not have to include the optical modulator 531 or components for performing a verify operation.

FIG. 19 illustrates basically how the read apparatus of this embodiment operates. Using multiple optical pickups 2A through 2L, the read apparatus retrieves data from the optical storage medium 108 at the same time. In FIG. 19, only the optical pickups 2H through 2L are illustrated as in FIG. 18. However, each of the other optical pickups not shown in FIG. 19 also retrieves data from its own track range. Then, the data that has been retrieved by those optical pickups 2A through 2L are stored in the buffer 521 shown in FIG. 3.

The frontend signal processing section 520 reconstructs the read data based on the data that is stored in the buffer 521. The read processing performed by the frontend signal processing section 520 may include all of the processing steps shown in FIG. 13 but the processing steps S1305 and S1306. By carrying out such processing, multiple pieces of data can be read from the buffer 521 and subjected to error correction and other necessary processing and then read data can be reconstructed.

As described above, the read apparatus of this embodiment can efficiently retrieve and read the data that has been written separately on multiple track ranges of an optical storage medium. As a result, a read apparatus qualified for even an optical storage medium that stores data of a huge size can be provided.

In the first through third embodiments of the present invention described above, the processing may be carried out by the system controller 540 by executing a program that defines such processing. Such a program may be circulated either by storing the program on a storage medium or by downloading it over telecommunications lines.

While various embodiments of an optical read/write apparatus according to the present invention have been described as the first through third embodiments, it will be apparent to those skilled in the art that the disclosed invention may be modified in numerous ways and may assume many embodiments other than those specifically described above. Accordingly, it is intended by the appended claims to cover all modifications and combinations of the invention that fall within the true spirit and scope of the invention.

An optical read/write apparatus according to an embodiment of the present invention can be used effectively to get a read/write operation done in a shorter time and to ensure writing data of quality with good stability in a bulk data storage system that performs read/write operations in parallel using multiple optical pickups at the same time (e.g., a data file system that uses an optical tape or an optical disc).

This application is based on Japanese Patent Applications No. 2011-224661 filed Oct. 12, 2011 and No. 2012-109020 filed May 11, 2012, the entire contents of which are hereby incorporated by reference.

What is claimed is:

1. An optical read/write apparatus comprising:
   a plurality of optical pickups arranged to cross tracks of an optical storage medium, each of the optical pickups configured to be able to write data on the optical storage medium and verify the data that has been written in parallel; and
   a control section configured to instruct the plurality of optical pickups to write data and verify if the data has been written accurately by those optical pickups,
   wherein on finding the data that has been written by any of those optical pickups inaccurate or on detecting any defect at a location where data is going to be written by any of the optical pickups, the control section instructs another one of the optical pickups to write that data on a different track from a track on which the data should have been written, and
   wherein the ranges of tracks on which data is able to be written are different from each other between the optical pickups.

2. The optical read/write apparatus of claim 1, wherein in making that another optical pickup write the data, the control section instructs the optical pickup to write not only that data but also a piece of information indicating a location on the optical storage medium on which that data should have been written.

3. The optical read/write apparatus of claim 1, wherein that another optical pickup is one of two terminal ones of the optical pickups.

4. The optical read/write apparatus of claim 1, wherein that another optical pickup is one of the optical pickups that is located at the tail with respect to tracks of the optical storage medium that are running.

5. The optical read/write apparatus of claim 1, wherein each of the plurality of optical pickups comprises:
   a light source;
   a light-splitting element configured to split the light beam that has been emitted from the light source into a write beam, a first read beam and a second read beam;
   an optical system configured to converge the write beam and the first and second read beams onto the same track on the optical storage medium so that the same location on the optical storage medium is scanned with the write beam before being scanned with the first read beam and is scanned with the second read beam before being scanned with the write beam; and
   a photodetector configured to receive the write beam and first and second read beams that have been reflected from the optical storage medium and output electrical signals.

6. The optical read/write apparatus of claim 1, wherein each of the plurality of optical pickups comprises:
   a light source configured to emit a write beam and a read beam;
   an optical system configured to converge the write beam and the read beam onto the same track on the optical storage medium so that the same location on the optical storage medium is scanned with the write beam before being scanned with the read beam; and
   a photodetector configured to receive the write and read beams that have been reflected from the optical storage medium and output electrical signals.

7. The optical read/write apparatus of claim 1, wherein if meander detecting data is stored on some of the tracks of the optical storage medium,
   the control section instructs one of the optical pickups that is able to read data from the track on which the meander detecting data is stored, to read that meander detecting data, and detects the meandering state of the optical storage medium based on the meander detecting data.

8. The optical read/write apparatus of claim 1, wherein the control section divides data to be written into multiple pieces and makes at least two of the optical pickups, excluding that another optical pickup, write those multiple pieces in parallel with each other.

9. The optical read/write apparatus of claim 8, wherein the control section instructs the at least two optical pickups to further write error correction codes that are associated with the multiple pieces.

10. The optical read/write apparatus of claim 1, wherein if data of a predetermined length has been written successfully by the plurality of optical pickups, the control section makes that another optical pickup write a piece of information indicating that the data of the predetermined length has been written successfully.

11. An optical read/write apparatus comprising:

a plurality of optical pickups arranged to cross tracks of an optical storage medium, each of the optical pickups configured to be able to write data on the optical storage medium and verify the data that has been written in parallel; and a control section configured to instruct the plurality of optical pickups to write data and verify if the data has been written accurately by those optical pickups, and configured to divide the data to be written into multiple pieces and instruct at least two of the optical pickups to write the multiple pieces in parallel with each other, and wherein the ranges of tracks on which data is able to be written are different from each other between the optical pickups.

12. The optical read/write apparatus of claim 11, wherein on finding the data that has been written by any of those optical pickups inaccurate or on detecting any defect at a location where data is going to be written by any of the optical pickups, the control section instructs another one of the optical pickups to write that data on a different track from a track on which the data should have been written.

* * * * *